US008612329B1

(12) United States Patent
Steidlmayer et al.

(10) Patent No.: US 8,612,329 B1
(45) Date of Patent: Dec. 17, 2013

(54) VOLUME CLARITY TRADING DISPLAY

(76) Inventors: J. Peter Steidlmayer, Wilmette, IL (US); William D. Cunningham, South Barrington, IL (US)

( * ) Notice: Subject to any disclaimer, the term of this patent is extended or adjusted under 35 U.S.C. 154(b) by 170 days.

(21) Appl. No.: 12/803,092

(22) Filed: Jun. 18, 2010

(51) Int. Cl.
*G06Q 40/00* (2012.01)

(52) U.S. Cl.
USPC .............................................. 705/37; 705/35

(58) Field of Classification Search
USPC ........................................................ 705/35
See application file for complete search history.

(56) References Cited

U.S. PATENT DOCUMENTS

| | | | |
|---|---|---|---|
| 5,454,104 A | | 9/1995 | Steidlmayer et al. |
| 7,193,628 B1* | | 3/2007 | Phillips et al. ................ 345/440 |
| 2003/0154153 A1 | | 8/2003 | Steidlmayer et al. |
| 2004/0148236 A1 | | 7/2004 | Steidlmayer |
| 2007/0022036 A1* | | 1/2007 | Korzinin ......................... 705/37 |
| 2007/0050278 A1 | | 3/2007 | Steidlmayer et al. |
| 2007/0055608 A1 | | 3/2007 | Steidlmayer et al. |
| 2007/0271199 A1* | | 11/2007 | Kedia ........................... 705/36 R |
| 2008/0172322 A1 | | 7/2008 | Steidlmayer et al. |
| 2009/0138368 A1* | | 5/2009 | Weiss et al. ..................... 705/26 |
| 2009/0234767 A1 | | 9/2009 | Steidlmayer et al. |
| 2010/0145844 A1 | | 6/2010 | Steidlmayer et al. |
| 2011/0258100 A1* | | 10/2011 | Krishna et al. ................. 705/37 |

OTHER PUBLICATIONS

Run lengths and liquidity Sanjiv R. Das • Paul Hanouna Published online: Jan. 21, 2009 © Springer Science+Business Media, LLC 2009.*
Preferred numbers and the distribution of trade sizes and trading volumes in the Chinese stock market Guo-Hua Mu1,2,3, Wei Chen4, J'anos Kert'esz3,5,a, and Wei-Xing Zhou1,2,6,7,8,b / Revised version: date.*

* cited by examiner

*Primary Examiner* — William Rankins
(74) *Attorney, Agent, or Firm* — Paul E Schaafsma; NovusIP, LLC

(57) ABSTRACT

In accordance with the principles of the present invention, an electronic trading interface and method for displaying trading data are provided. Reported trade prices are received. The largest volume for a trading price is determined. The largest volume for a trading price is normalized to establish a highest volume number. In one embodiment, the highest volume number is established by dividing the largest volume for a trading price by an adjusted percentage of itself. The remaining volumes for trading prices are normalized by the same method used to establish the highest volume number. The normalized volumes for trading prices are displayed. Thus, a trader is able to read volume earlier and clearer, thus providing an economic opportunity outside the singularity of the present. This Abstract is submitted with the understanding that it will not be used to interprete or limit the scope or meaning of the claims.

30 Claims, 28 Drawing Sheets

FIG. 3

| | | | | | | | | |
|---|---|---|---|---|---|---|---|---|
| D | U | O | D | U | SIM: E-mini S&P 500 – Jun10 – Contract | | | |
| B CLR | | R CLR | | | SP | Jun10 | Sep10 | Dec10 | Mar10 |
| Vol | | | | | L: 0 | Net: 0 | | |
| Time | | | | | T SL Oc Ac | UP&L: 0 | | |
| Basis | | Clr | | | X Σ 5 6 7 8 9 | | | |
| | | | | | Y | | | |
| | | | | | Z C 0 1 2 3 4 | | | |
| UP | DW | MKT | | 118975 | B R | ▲ | | Open |

| | Total | My B | Bid | +750 | Offer | My O |
|---|---|---|---|---|---|---|
| 119125 | 0 | | | 119125 | | |
| 119100 | 0 | | | 119100 | | |
| 119075 | 0 | | | 119075 | R 4217 | |
| 119050 | 0 | | | 119050 | R 3660 | |
| 119025 | 0 | | | 119025 | R 1940 | |
| 119000 | 0 | | | 119000 | R 2330 | |
| 118975 | 2400 | G 2400 | | 118975 | R 1284 | |
| 118950 | 2911 | G 2911 | | 118950 | R 1661 | |
| 118925 | 9290 | G 9290 | | 118925 | R 1745 | |
| 118900 | 11587 | G 11587 | | 118900 | R 1130 | |
| 118875 | 16166 | G 16166 | | 118875 | R 1073 | |
| 118850 | 18268 | G 18268 | | G 118850 /55 | R 575 | |
| 118825 | 31122 | G 31122 | B 639 | 118825 | | |
| 118800 | 33207 | G 33207 | B 1245 | 118800 | | |
| 118775 | 24830 | G 24830 | B 1181 | 118775 | | |
| 118750 | 27932 | G 27932 | B 1309 | 118750 | | |
| 118725 | 23370 | G 23370 | B 1265 | 118725 | | |
| 118700 | 26208 | G 26208 | B 1086 | 118700 | | |
| 118675 | 36511 | G 36511 | B 1214 | 118675 | | |
| 118650 | 50217 | G 50217 | B 1381 | 118650 | | |
| 118625 | 60309 | G 60309 | B 1460 | 118625 | | |
| 118600 | 81211 | G 81211 | B 1470 | 118600 | | |
| 118575 | 69786 | G 69786 | | 118575 | | |
| 118550 | 53702 | G 53702 | | 118550 | | |
| 118525 | 41911 | G 41911 | | 118525 | | |
| | | G 60233 | | 118500 | | |
| | 117675 | | | ▼ | | 1459187 |

FIG. 4

| | | | | | | | |
|---|---|---|---|---|---|---|---|
| | | | SIM: E-mini S&P 500 – Jun10 – Contract | | | | |
| | | SP | Jun10 | Sep10 | Dec10 | Mar10 | |
| | | L: 0 | | Net: 0 UP&L: 0 | | | |
| | | T | SL | O_CO | A_CT | | |
| X | Σ | | 5 | 6 | 7 | 8 | 9 |
| Y | C | | 0 | 1 | 2 | 3 | 4 |
| Z | | | | | | | |

| Total | My B | Bid | +775 | Offer | My O |
|---|---|---|---|---|---|
| 118975 | B^R | | ▲ | | ☐ Open |
| | | | 119150 | | |
| 119150 | 0 | | 119125 | | |
| DB | DB | | 119100 | R 4323 | |
| DB | DB | | 119075 | R 4304 | |
| DB | DB | | 119050 | R 2090 | |
| DB | DB | | 119025 | R 2065 | |
| DB | DB | | 119000 | R 2847 | |
| DB | DB | | 118975 | R 2080 | |
| 118975 | 2400 | G 2400 | | 118950 | R 2405 |
| 118950 | 2911 | G 2911 | | 118925 | R 1759 |
| 118925 | 9290 | G 9299 | | 118900 | R 785 |
| 118900 | 11587 | G 13283 | | G 118875 / 1 | R 478 |
| 118875 | 16166 | G 18148 | B 694 | 118850 | |
| 118850 | 18268 | G 20300 | B 1046 | 118825 | |
| 118825 | 31122 | G 32133 | B 1444 | 118800 | |
| 118800 | 33207 | G 33194 | B 1150 | 118775 | |
| 118775 | 24830 | G 24298 | B 1330 | 118750 | |
| 118750 | 27932 | G 28472 | B 1179 | 118725 | |
| 118725 | 23370 | G 23370 | B 1081 | 118700 | |
| 118700 | 26208 | G 26208 | B 1330 | 118675 | |
| 118675 | 36511 | G 36511 | B 1409 | 118650 | |
| 118650 | 50217 | G 50217 | B 1766 | 118625 | |
| 118625 | 60309 | G 60309 | | 118600 | |
| 118600 | 81211 | G 81211 | | 118575 | |
| 118575 | 69786 | G 69786 | | 118550 | |
| 118550 | 53702 | G 53702 | | 118525 | |
| | | G 41911 | | | |
| | | 117675 | ▼ | | 1465912 |

| Total | My B | Bid | +300 | Offer | My O |
|---|---|---|---|---|---|
| 118675 | 0 | G 36511 | | 118675 | |
| 118650 | 0 | G 53707 | | 118650 | |
| 118625 | 0 | G 62647 | | 118625 | R 1165 |
| 118600 | 0 | G 86592 | | 118600 | R 1289 |
| 118575 | 0 | G 75816 | | 118575 | R 1289 |
| 118550 | 0 | G 60718 | | 118550 | R 1055 |
| 118525 | 0 | G 51715 | | 118525 | R 658 |
| 118500 | 0 | G 71835 | | 118500 | R 1596 |
| 118475 | 327 | G 71444 | | 118475 | R 674 |
| 118450 | 2645 | G 74047 | | 118450 | R 702 |
| 118425 | 4272 | G 77397 | | 118425 | R 616 |
| 118400 | 6395 | G 72589 | | G 118400 /5 | R 242 |
| 118375 | 3362 | G 70684 | B 429 | 118375 | |
| 118350 | 2116 | G 53984 | B 695 | 118350 | |
| 118325 | 129 | G 46048 | B 892 | 118325 | |
| 118300 | 0 | G 58904 | B 1121 | 118300 | |
| 118275 | 0 | G 58422 | B 762 | 118275 | |
| 118250 | 0 | G 46194 | B 643 | 118250 | |
| 118225 | 0 | G 29537 | B 786 | 118225 | |
| 118200 | 0 | G 24106 | B 2117 | 118200 | |
| 118175 | 0 | G 14247 | B 931 | 118175 | |
| 118150 | 0 | G 13007 | B 1162 | 118150 | |
| 118125 | 0 | G 10629 | | 118125 | |
| 118100 | 0 | G 10529 | | 118100 | |
| 118075 | 0 | G 8214 | | 118075 | |
| | | G 10430 | | 118050 | |
| | | 117675 | | ▼ | 1664184 |

| | | | | | | | | |
|---|---|---|---|---|---|---|---|---|
| | | | SIM: E-mini S&P 500 - Jun10 - Contract | | | | | |
| D | U | O | D | U | SP | Jun10 | Sep10 | Dec10 | Mar10 |
| B CLR | R CLR | | L: 0 | | Net: 0 UP&L: 0 | | | |
| Vol | 2000 | | T | SL | Oc/O | Ac/T | | |
| Time | | | X | Σ | 5 | 6 | 7 | 8 | 9 |
| Basis | Clr | | Y | C | 0 | 1 | 2 | 3 | 4 |
| 118600 | ▼ | | Z | | | | | |
| UP | DW | MKT | 118975 | B R | | ▲ | | ☐ Open |

| | | Total | My B | Bid | -25 | Offer | My O |
|---|---|---|---|---|---|---|---|
| 118350 | 63 | G 71327 | | | 118375 | | |
| 118325 | 54 | G 54954 | | | 118350 | | |
| 118300 | 70 | G 47213 | | | 118325 | | |
| 118275 | 68 | G 60821 | | | 118300 | R 1143 | |
| 118250 | 55 | G 59461 | | | 118275 | R 1206 | |
| 118225 | 42 | G 48440 | | | 118250 | R 1145 | |
| 118200 | 30 | G 36557 | | | 118225 | R 1306 | |
| 118175 | 20 | G 26409 | | | 118200 | R 713 | |
| 118150 | 19 | G 17335 | | | 118175 | R 584 | |
| 118125 | 14 | G 17003 | | | 118150 | R 929 | |
| 118100 | 259 | G 12858 | | | 118125 | R 665 | |
| 118075 | 3831 | G 15701 | | | 118100 | R 599 | |
| 118050 | 750 | G 14576 | | | G 118075 / 4 | R 32 | |
| 118025 | 497 | G 14421 | | B 345 | 118050 | | |
| 118000 | 748 | G 12866 | | B 509 | 118025 | | |
| 117975 | 1221 | G 19987 | | B 922 | 118000 | | |
| 117950 | 849 | G 15385 | | B 552 | 117975 | | |
| 117925 | 1811 | G 16965 | | B 558 | 117950 | | |
| 117900 | 3817 | G 21182 | | B 613 | 117925 | | |
| 117875 | 6025 | G 23662 | | B 710 | 117900 | | |
| 117850 | 2206 | G 23433 | | B 771 | 117875 | | |
| 117825 | 14 | G 19251 | | B 1001 | 117850 | | |
| 117800 | 14 | G 12900 | | B 992 | 117825 | | |
| 117775 | 9 | G 12176 | | | 117800 | | |
| 117750 | 8 | G 8387 | | | 117775 | | |
| | | G 7233 | | | 117750 | | |
| | | 117675 | | | ▼ | | 1753791 |

FIG. 16

| | | | | | | | | |
|---|---|---|---|---|---|---|---|---|
| | | SIM: E-mini S&P 500 – Jun10 – Contract | | | | | | |
| | SP | Jun10 | Sep10 | Dec10 | Mar10 | | | |
| | L: 0 | | Net: 0 | | | | | |
| | T | SL | OCO | ACT | UP&L: 0 | | | |
| X | Σ | 5 | 6 | 7 | 8 | 9 | | |
| Y | C | 0 | 1 | 2 | 3 | 4 | | |
| Z | | | | | | | | |

| Total | | My B | Bid | +100 | Offer | My O |
|---|---|---|---|---|---|---|
| 118550 | 0 | G 71835 | | 118500 | | |
| 118525 | 0 | G 71444 | | 118475 | | |
| 118500 | 0 | G 74047 | | 118450 | R 1685 | |
| 118475 | 0 | G 77885 | | 118425 | R 1144 | |
| 118450 | 0 | G 75504 | | 118400 | R 1698 | |
| 118425 | 7 | G 76148 | | 118375 | R 1152 | |
| 118400 | 38 | G 63931 | | 118350 | R 836 | |
| 118375 | 51 | G 53553 | | 118325 | R 1001 | |
| 118350 | 99 | G 67194 | | 118300 | R 734 | |
| 118325 | 64 | G 68035 | | 118275 | R 740 | |
| 118300 | 61 | G 55441 | | 118250 | R 539 | |
| 118275 | 82 | G 39427 | | 118225 | R 282 | |
| 118250 | 79 | G 27954 | B 478 | G 118200 / 2 | | |
| 118225 | 18 | G 17996 | B 894 | 118175 | | |
| 118200 | 0 | G 19148 | B 807 | 118150 | | |
| 118175 | 0 | G 13288 | B 797 | 118125 | | |
| 118150 | 0 | G 18692 | B 928 | 118100 | | |
| 118125 | 0 | G 16529 | B 882 | 118075 | | |
| 118100 | 0 | G 16458 | B 825 | 118050 | | |
| 118075 | 0 | G 12947 | B 1423 | 118025 | | |
| 118050 | 0 | G 19987 | B 991 | 118000 | | |
| 118025 | 0 | G 15385 | B 1261 | 117975 | | |
| 118000 | 0 | G 16965 | | 117950 | | |
| 117975 | 0 | G 21182 | | 117925 | | |
| 117950 | 0 | G 23662 | | 117900 | | |
| | | G 23433 | | 117875 | | |
| | | 117675 | | ▼ | 1813948 | |

FIG. 17

| | | | | | | | |
|---|---|---|---|---|---|---|---|
| | | SIM: E-mini S&P 500 - Jun10 - Contract | | | | | |
| | | SP | Jun10 | Sep10 | Dec10 | Mar10 | |
| | | L: 0 | | Net: 0 | | | |
| | | T SL O$_C$ A$_{CT}$ | | UP&L: 0 | | | |
| X | Σ | | 5 | 6 | 7 | 8 | 9 |
| Y | C | | 0 | 1 | 2 | 3 | 4 |
| Z | | | | | | | |

| | | | | | | Open |
|---|---|---|---|---|---|---|
| 118975 | B R | | ▲ | | | |
| Total | My B | Bid | +125 | Offer | My O | |
| 0 | G 71835 | | 118500 | | | |
| 0 | G 71444 | | 118475 | | | |
| 0 | G 74047 | | 118450 | R 1782 | | |
| 7 | G 77885 | | 118425 | R 1279 | | |
| 38 | G 75504 | | 118400 | R 1452 | | |
| 51 | G 76148 | | 118375 | R 1237 | | |
| 720 | G 64552 | | 118350 | R 959 | | |
| 2312 | G 55801 | | 118325 | R 1213 | | |
| 1611 | G 68744 | | 118300 | R 568 | | |
| 2523 | G 70476 | | 118275 | R 435 | | |
| 3576 | G 58741 | | 118250 | R 497 | | |
| 3529 | G 42222 | | G 118225 /6 | R 421 | | |
| 5065 | G 32951 | B 132 | 118200 | | | |
| 1058 | G 19054 | B 424 | 118175 | | | |
| 102 | G 19250 | B 664 | 118150 | | | |
| 0 | G 13288 | B 1267 | 118125 | | | |
| 0 | G 18692 | B 1092 | 118100 | | | |
| 0 | G 16529 | B 966 | 118075 | | | |
| 0 | G 16458 | B 948 | 118050 | | | |
| 0 | G 12947 | B 1315 | 118025 | | | |
| 0 | G 19987 | B 1096 | 118000 | | | |
| 0 | G 15385 | B 1256 | 117975 | | | |
| 0 | G 16965 | | 117950 | | | |
| 0 | G 21182 | | 117925 | | | |
| 0 | G 23662 | | 117900 | | | |
| | G 23433 | | 117875 | | | |
| 117675 | | | ▼ | | 1833060 | |

| Total | My B | Bid | +75 | Offer | My O |
|---|---|---|---|---|---|
| DB | DB | G 74273 | | 118450 | |
| 118425 | 0 | G 80308 | | 118425 | R 1585 |
| 118400 | 0 | G 81562 | | 118400 | R 1984 |
| 118375 | 0 | G 86165 | | 118375 | R 1227 |
| 118350 | 0 | G 79015 | | 118350 | R 1020 |
| 118325 | 0 | G 62593 | | 118325 | R 743 |
| 118300 | 0 | G 74713 | | 118300 | R 703 |
| 118275 | 0 | G 79324 | | 118275 | R 1054 |
| S 118250 | S 0 | G 68187 | | 118250 | R 713 |
| S 118225 | S 0 | G 45444 | | 118225 | R 923 |
| S 118200 | S 0 | G 35806 | | 118200 | R 759 |
| S 118175 | S 473 | G 22291 | B 44 | G 118175 / 531 | |
| 118150 | 303 | G 20403 | B 299 | 118150 | |
| 118125 | 322 | G 14898 | B 558 | 118125 | |
| 118100 | 0 | G 18692 | B 1053 | 118100 | |
| 118075 | 0 | G 16529 | B 936 | 118075 | |
| 118050 | 0 | G 16458 | B 1112 | 118050 | |
| 118025 | 0 | G 12947 | B 1364 | 118025 | |
| 118000 | 0 | G 19987 | B 1661 | 118000 | |
| 117975 | 0 | G 15385 | B 1416 | 117975 | |
| 117950 | 0 | G 16965 | B 974 | 117950 | |
| 117925 | 0 | G 21182 | | 117925 | |
| 117900 | 0 | G 23662 | | 117900 | |
| 117875 | 0 | G 23433 | | 117875 | |
| 117850 | 0 | G 19251 | | 117850 | |
| | | G 19309 | | 117825 | |
| 117675 | | | ▼ | | 1909379 |

VOLUME CLARITY TRADING DISPLAY

FIELD OF THE INVENTION

The present invention relates to electronic trading systems and displays.

BACKGROUND OF THE INVENTION

A variety of different types of contracts are traded on various exchanges and other markets throughout the world. A cash contract is a sales agreement for either immediate or deferred delivery of the actual equity or commodity. An option is a contract that conveys the right, but not the obligation, to buy or sell a particular equity, commodity or futures contract on an equity or commodity at a certain price for a limited time. A call option is an option that gives the buyer the right, but not the obligation, to purchase the underlying equity, commodity or futures contract at a certain price (known as the strike price) on or before the expiration date. A put option is an option that gives the option buyer the right, but not the obligation, to sell the underlying equity, commodity or futures contract at the strike price on or before the expiration date.

A futures contract is a legally binding agreement, typically entered into on or pursuant to the rules of an exchange, to buy or sell an asset (such as an equity or a commodity) sometime in the future. An equity is generally an ownership interest in an asset such as stock in a company. In a narrow sense not intended for use herein, futures, options, and stocks are contracts for products traded on formally organized exchanges.

A derivatives contract is a financial instrument, the value of which is linked to the price of an underlying such as a commodity, asset, rate, index or the occurrence or magnitude of an event. A commodity is generally an article of commerce or a product that can be used for commerce. The types of commodities commonly include agricultural products such as corn, soybeans, and wheat; precious metals such as gold; fuels such as petroleum; foreign currencies such as the Euro; financial instruments such as U.S. Treasury securities; and financial indexes such as the Standard & Poor's® 500 stock index, to name a few. Standard & Poor's® 500 stock index is disseminated by Standard & Poor's, 55 Water Street, New York, N.Y. 10041. Unlike cash commercial contracts, futures contracts very rarely result in delivery, because most are liquidated by offsetting positions prior to expiration. Typical examples of derivatives contracts include futures, forwards, options, swaps, and swaptions, and these can be combined with traditional financial instruments, investments, and loans to create hybrid financial instruments.

At one time, there were only open-outcry exchanges. An open-outcry exchange is a public auction system that involves traders standing in a trading "pit" and calling out prices and quantities that indicate their willingness to buy or sell, so that the information is available to all traders. Open-outcry traders use hand signals to convey the same information; otherwise, it would be difficult to hear with so many people shouting at the same time. Open outcry is an efficient means of "price discovery," allowing purchasers and sellers to arrive at the best prices given the supply and demand for a tradable object.

Pit trading is increasingly augmented and sometimes replaced by electronic trading systems that process automatic and electronic matching of bids and offers. The desire for immediacy of order execution and dissemination of information is one reason for the steady switch to electronic mechanisms. In recent years, the popularity of electronic trading has caused market share to rapidly migrate from the open-outcry exchanges to electronic trading. Thus, trading methods have evolved from a manually intensive process to technology enabled, electronic platforms.

Generally, electronic markets have replaced direct liquidity with market access—where access is mostly available at the bid or ask prices, which have created a much faster trading environment. The imbalance related to entry is now always present so by trading "with" the market, traders are able to profit from price fluctuations while simultaneously adding default liquidity. Default liquidity arises when there has been enough repeated trade at surrounding prices to cause an increased availability to access. Imbalance rather than efficiency is the major change that has structurally occurred due to electronic trading as time—the needed ingredient for efficiency—has been curtailed.

Electronic trading is generally based on centralized (host) computers, one or more computer networks, and exchange participant's (client) computers. In general, the host exchange includes one or more centralized computers. The operations of the host exchange typically include order matching, maintaining order books and positions, price information, and managing and updating the database for the online trading day. The host exchange is also equipped with external interfaces that maintain contact to quote vendors and other price information systems. Software running on client devices allows market participants to log onto one or more exchanges and participate in the market. Using client devices, market participants or traders link to the host exchange through one or more computer networks.

The processing of volume today has been keyed to accumulation differentials at various prices throughout an assigned timeframe, such as for example a minute, hour, day or week, etc. Studies related to this output use accumulation as a basis, and as volume grows displaying it in multiple and more revealing formats within the limited screen space available in the matching engines becomes very difficult. In addition, as volume grows allowing a trader to visualize the data into distinct visual segments becomes very difficult due to the overlapping nature of continuous accumulation related to various market stimuli. Versus just being an accumulate and used as an adjective to help define price, it would be advantageous for volume to stand alone and offer far deeper insights to market activity as an equal or greater than reference to price—one could actually arbitrage volume to volume and as well as volume versus price, instead of the more traditional arbitrage of price to price.

Markets have an inherited complexity that precludes using the concept that the whole has any working parts except price, and further that the resultant prices are fair and balanced, which they are not. The unwritten axiom related to anything financial is that outcomes will always be less than needed versus normal expectations, and it is a function of a lack of understanding of the working nomenclature of markets that brings this to bear. Market efficiency, zero sums, etc. as claimed by academia, and in general, the skeleton reporting of market activity as price has further entrenched that the whole is just one summary price.

Markets in their development are a lot more than the finalized reported output, financially speaking. In the latter, such output is slightly less than one-to-one, while in reality the real output is much greater due to internal leveraging of time and repeated usage of parts of its developed range. This enlarged base is made up of price rotations within that range due to liquidity, supply imbalances related to volume dispersal around larger prices, new range developments to provide continued access, movement of volume away from current area of usage to a new one within an already established range, the movement away from any or all of the above, and finally the use of the trade in relationships to other markets.

If a market has a reported range of a certain number of dollars, the settlement price segments it to much less, the net change from a previous price is again most often less than that period's range, which sets up the notion that that value is less than one-to-one operatively while the hidden sub-parts add up to more than that total. Categorizing the above developments into a progressive order can and does define specialization of market development, and rotation and leverage allow greater than normally reported differentials—repeating a trading range is in total always greater than the reported singular output, leverage in other zones provide ways to defeat time costs normally associated with the whole, and external uses offer additional range as well as leverage, all of which provide a greater than opportunity base.

There are many zones of activity within a market's development and most overlap each other's activity, thus making a clear distinction of such defined areas very difficult. In the past, where price efficiency ruled, it was impossible to make a clear distinction as to what or why the market was doing as the overlap was total, and therefore by default price was the lone readable instrument. Separation of both buying and selling activities has emerged in the markets as of late, and the overlapping of trading zones, which used to be total, is now far more separate. This overlapping, which has caused people to look at the whole of development as singular rather than plural, makes the emphasis on its ending position versus how it got there. This new separation related to data offers traders a consistently true economic advantage that at best was just sometimes available in the past.

Specialization within the trading venue has been one of the main reason markets were efficient as (a) price(s) offered at the bid or ask always could be used to an advantage in some trader's program—where each of the traders defined their respective zone of activity by their participation. Specialization in trading fostered competition within this singular yet plural approach, but more importantly offered different and differing advantages to all programs at the same time. This broader framework created a very competitive marketplace, which in turn served the market well as all this activity was at the beginning of activity that produced the resultants of price or prices that were then broadcast to the world at large for any and all possible uses.

The market always started with a relatively large but still quite small overall range that usually was further defined by extensions at one end and then progressed to a fair traded area or price zone that met the goals of most users. If the market-established range was wrong or new information was evident in the sense that supply or demand was out of balance, the market would then move further in one direction to find a new balance or an equilibrium that would serve as a new base. Lastly, the market would traverse any established value range to attract business and bring additional external buying and selling from those margins because of perceived advantages to their usage at the various prices offered during those rotations—in other words, facilitating trades.

Traders would approach the market from any of the following steps: they would trade price-to-price; they would trade price/quantity to price; they would trade leverage (leverage being defined as an internal relationship of time and price) to price; they would trade price to leverage; they would trade leverage-to-leverage, all as conditions warranted or would await just their own specialty. In addition, trade would migrate to time spreads between contact months or go to contracts outside of the immediate contract—all of which makes the opportunity base far greater than that less than normally associated to the information costs long associated with defining and using the markets as a singular price entity.

Some zones of trade activity were skipped and others were never reached—due to lack of trade or too much trade. Traders needed to trade in step within their respective zones with whatever market development was happening, and be able to stop, avoid or restart into any new category as the disciplines as well as opportunities were changing and therefore becoming different and difficult to analyze. A trader does not want to get lost on a whole as any definitive advantage will have disappeared. In open-outcry markets all this activity was a great deal more transparent to those in the trading pits. Today, with electronic trading dominating the various activities, this type of transparency is missing along with the many different zones of trade activity, which in turn has amplified volatility. There is a big difference in liquidity—which offers a form of immediate replacement—and that of access—which offers availability only at that moment in market history. The difference in price access can be large or small while liquidity offers repeated means of access as discussed previously—access offers that same chance to much lesser degree. The net effect of liquidity on markets was vertical stability as vertical risk was laid off into many various venues rather than remaining in the singular. While providing access, electronic platforms do not offer substitution and thus its vertical price platform is very unstable. Liquidity also brought supply and demand forces together within an immediate price through this same substitution, and one must note that these two dominate market forces were always functioning with a pronounced time lag—one always occurred before the other, and it should also be noted that the lessening of liquidity is responsible for the market separation that we see today.

Volume today is a means of getting information related to access imbalance due to supply or demand forces being separate as volume is accumulated and tabulated as it occurs on electronic trading platforms. Trading today is more reactive as access is mostly available to all trading zones as a singular format, which has had the effect of removing time and therefore speeding up the market. So instead of price being universal, it is access today that offers only one size for all and that size is mostly vertical in nature. The tone of the market is not varied as in the past as the one-price-fits-all for access forces the market into a monotone of fast to impossibly fast related to price or no trade interest at all—making prices and the resultant pricing scale a very unstable part of the market versus the past. In the past, the vertical part of the market used multiple developments and limited retracement of those price ranges within each instance as a force for vertical stability; today, the cost of using access as a singular force has eliminated time and replaced it with more range seeking properties in each direction. The resultant zones of trading activities are then formed more as an eventual resultant than being a focused development as in the past.

Volume accumulation at each trade price provides an earlier read of the in place as well as future imbalanced development zones that represent the blueprint of vertical market activity today. Volatility is born as a result of forced reactions to price activity versus the more defined opportunities of the past that resided within a limited range of price development (value areas). A trading interface that enabled users to read volume earlier and clearer would provide an economic opportunity outside the singularity of the present price, and this broadened base would in turn stabilize the vertical base of markets by defining each zone of separation, thereby allowing specialization to again be a force within development.

Volume is conveyed in an accumulative format where the sheer size of volume makes reading the data extremely difficult beyond the whole of it at the end. Volume has been broken down into categories of the amount of buying at the bid versus selling at the ask as well as other singular insights, but as markets are moving to all entries being the same, the net of that net is quite small and those types of differentials will not be long-lasting information sources. Volumes from markets open day and night have a problem with its variance related to trade magnitude differentials when incorporating them as a whole as those merged data need to be distinguished yet included.

SUMMARY OF THE INVENTION

An electronic trading interface in accordance with the principles of the present invention enables users to read volume earlier and clearer, thus providing an economic opportunity outside the singularity of the present. An electronic trading interface in accordance with the principles of the present invention stabilizes the vertical base of markets by defining each zone of activity, thereby allowing specialization to again be a force with development. An electronic trading interface in accordance with the principles of the present invention enables removed time to be gained back by having total definition of development related to a market imbalance before proceeding to the next, which adds a depth of field to a price procedure that is now devoid of this dimension. An electronic trading interface in accordance with the principles of the present invention enables users to avoid this increasing singularity of less than that was the hallmark of efficient markets. An electronic trading interface in accordance with the principles of the present invention enables direct trading interface from new volume increments to access the market instead of going to the pricing scale. An electronic trading interface in accordance with the principles of the present invention enables an interface to the distribution of volume as it relates to continual entry imbalances, which can be described as one-half or less than that of a normal distribution pattern.

In accordance with the principles of the present invention, an electronic trading interface for trading data is provided. An electronic trading interface in accordance with the principles of the present illustrates volume that corresponds to reported trade prices as they flow from exchanges or electronic front ends. An electronic trading interface in accordance with the principles of the present invention reduces the accruing accumulated totals at each price to readable size(s) and eliminates data to help define areas that are hidden by overlap. This in turn helps users find the separation that is there today. Reported trade prices are received as well as the last or current price indicated by color in the volume array. The largest volume for a trading price is determined. The largest volume for a trading price is normalized to establish a highest volume number. In one embodiment, the highest volume number is established by dividing the largest volume for a trading price by an adjusted percentage of itself. The remaining volumes for trading prices are normalized by the same method used to establish the highest volume number. These normalized volumes for trading prices are displayed in a volume array.

This Summary introduced concepts in a simplified form that are further described below in the Detailed Description. This Summary is not intended to identify key features or essential elements of the claimed subject matter, nor is this Summary intended to be used as an aid in determining the scope of the claimed subject matter.

BRIEF DESCRIPTION OF THE DRAWINGS

FIG. 3 is a screen shot of the example electronic trading display of FIG. 2 showing a misalignment of the pricing information with the example electronic trading display of the prior art.

FIG. 4 is a screen shot of the example electronic trading display of FIG. 2 showing an alignment of the pricing information with the example electronic trading display of the prior art.

FIGS. 5-7 are screen shots of the example electronic trading display of FIG. 2 showing a redaction feature.

FIG. 8 is a screen shot of the example electronic trading display of FIG. 2 showing a basis trade feature.

FIGS. 9-10 are screen shots of the example electronic trading display of FIG. 2 in conjunction with the overlay feature of the basis program.

FIGS. 11-13 are screen shots of the example electronic trading display of FIG. 2 in conjunction with a volume request.

FIGS. 14-16 are screen shots of the example electronic trading display of FIG. 2 in conjunction with a small volume request.

FIG. 17 is a screen shot of the example electronic trading display of FIG. 2 showing volume events.

FIGS. 18-20 are screen shots of the example electronic trading display of FIG. 2 in conjunction with a time request.

FIGS. 23-24 are screen shots of the example electronic trading display of FIG. 2 that combine redaction and a fast volume requirement of 2000 contracts by confining the output to being inside the set parameters.

DETAILED DESCRIPTION OF THE PREFERRED EMBODIMENTS

Figure 1:
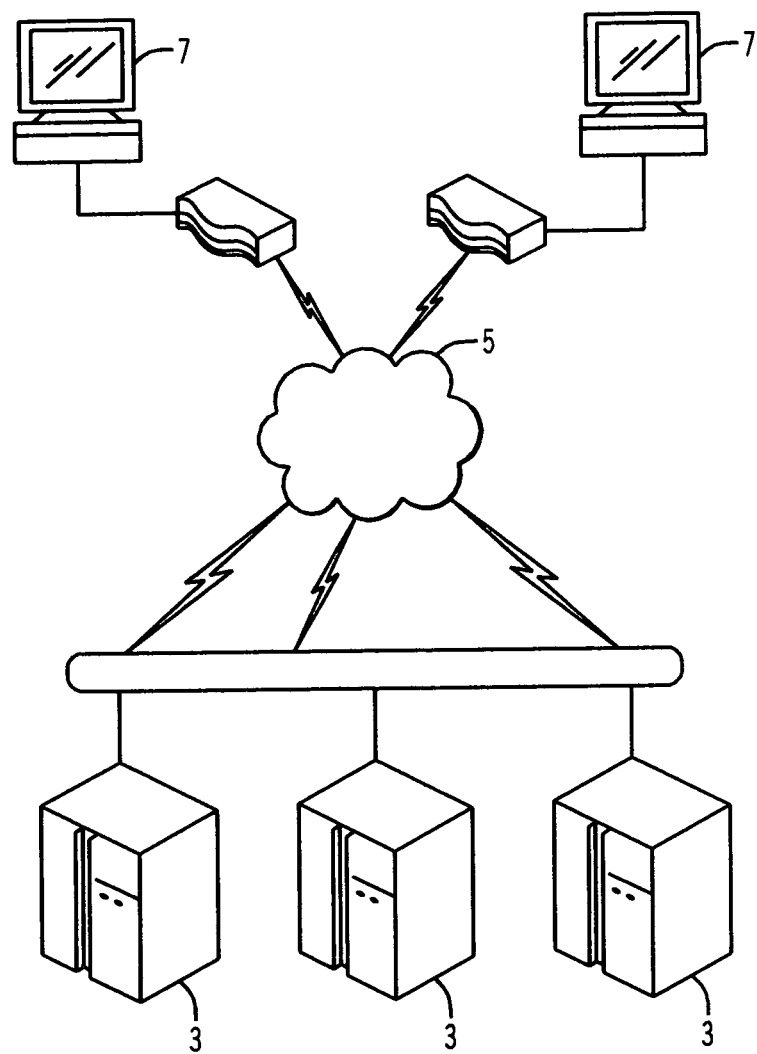
FIG. 1 is a schematic of a non-limiting example hardware architecture that can be used to run the system of the present invention.

Market progression has an outline and can be fulfilled in sequence or get part way, start all over, overlap existing trade zones, blend in or totally obscure the data from an earlier start. Leverage can come from dominate time frames (day versus end of day or night, etc.) or where light-traded timeframes move at a much faster pace in the same range, where large volumes traded at each price within a large range in an active period of time. It would be very difficult in an active traded section, category or time zone to move vertically away from a heavily traded base in a time zone as immense trade at those prices offers a large degree of liquidity by default (where liquidity is termed to be a temporary replacement for a short period of time). In the more current time zones of Asian, European, and North American, varying bases volumes have to be dealt with within the structure of the pricing scale, and quite often the lesser volumes will ignore or push the larger aside, which is very much out of character to past pricing scales. Where data is accumulated or amalgamated into ever increasing singularity of less than, the ability of one's exposure to the market will tend to mostly follow the untold or unwritten axiom of less than related to personal needs or goals.

An electronic trading interface in accordance with the principles of the present invention enables users to read volume earlier and clearer, thus providing an economic opportunity outside the singularity of the present price. An electronic trading interface in accordance with the principles of the present invention stabilizes the vertical base of markets by defining each zone of activity, thereby allowing specialization to again be a force with development. An electronic trading interface in accordance with the principles of the present invention enables time to be gained by having total definition of development related to a market imbalance before proceeding to the next, which adds a depth of field to a price procedure that is now devoid of this dimension. An electronic trading interface in accordance with the principles of the present invention enables users to avoid this increasing singularity of less than that was the hallmark of efficient markets. An electronic trading interface in accordance with the principles of the present invention enables direct trading interface from new volume increments to access the market instead of going to the pricing scale. An electronic trading interface in accordance with the principles of the present invention enables an interface to the distribution of volume as it relates to continual entry imbalances.

An electronic trading display in accordance with the principles of the present invention provides a clear, clutter-free depiction of volume data as it emerges into the market from on-line trading or other forms of trade accumulation associated with market activity. An electronic trading display in accordance with the principles of the present invention can be constantly refreshed, which then allows a constant base display to be depicted as well as the force that was necessary to subdue it—the divisor. This constant base is an asset to the trader as it can only change in a finite number of ways, mostly through inclusion, exclusion or elimination, so that immediate transparent differences are revealed in the comfort found in a repetitive format that in turn defines the volatility within any developing vertical range—the most important part of market activity for a trader. Note that development today is oriented towards the vertical versus being horizontally as in the past, where a pricing difference gave limited but repeated opportunities to the trader.

In the efficient market, price and time would equate to volume—that is, the market would find the high volume efficient price by establishing early vertical references (a high and a low). Then, by trading back and forth within this range a fair price would emerge in that it was actual market usage of that price that created it. It was the price that was used the most, and therefore a price also that had time of possession in its favor. Price under these conditions was servicing demand over supply in that price came before supply in market development, and volume at all other prices within the range were relative to each other in terms of price and time. This demand first and supply second scenario is the basis of separation today, and this characteristic was subdued by very strong market liquidity that in fact merged both into the same time frame where there was some give and take related to pricing activity on a temporary basis. The orientation of markets today is broken down into imbalances where either supply or demand is being featured on an ever changing menu, which leads then to greater than influence of one over the other rather than the checks and balances one would expect in a give and take operation—thus creating the one-dimensionality of markets today.

Volume is accumulative as a whole and defined as simply large or small. Price really created volume, and was first in data nomenclature as prices being efficient had time on their side and would not stray very far. Even though volume was first needed to make a trade, price would not necessarily change, and therefore this normal relationship was reversed, making price first and volume second related to market data. The markets were balanced due to exchange liquidity taking out any order entry imbalances to such a degree that they were mostly non-detectable, and had a very short time span if and they were able to surface.

With exchange liquidity a thing of the past, imbalance due to market access is always present to some degree in market prices. The ratio of price/time to volume is no longer equal, and volume has moved back to being first in market data as volume now effects price changes as a regular occurrence. Most traders want faster and faster price feeds to take advantage of time, but it remains that volume is faster than price in the new data environment. The dispersal pattern of volume inside the already developed market can dramatically affect future pricing scenarios, as accumulated internal imbalances have a profound influence on the bid/ask prices that are above and below the current pricing structure. Accumulated imbalances are mostly responsible for the increase or decrease of availability into the future as an almost known entity, and are the reason that trading and traders now have an economic advantage versus a disadvantage they needed to overcome when markets were efficient. Any present imbalance can always be overwhelmed by the new, but still over a period of time the net will still favor the trader.

The present invention breaks volume down into workable parts and allows for time to be measured in terms of comparable developmental standards. Volume in the present invention becomes one-dimensional in that each sample can only increase. The markets are one-dimensional related to whatever imbalance is present. A volume increase or lack thereof can be very influential in the growth or submission of any imbalance, which then gives the trader the opportunity to match the situation in the same one-dimensional format.

The markets can get to a balanced state by default where volume accumulation at a range of related prices offers liquidity to access because access volume is less than normal free availability at each potential price. Access to the markets in the present invention is available by defining price, time or volume, as each independently offers an insight to opportunity versus just that of price, which was all encompassing in the past. Time and or an increasing volume increment are faster than price in that they offer a single instance of access while price can only be thought of as offering multiple chances at the same or different chances in the pricing scale. The net result is that the former fit the one-dimensionality of today's markets while the latter being two-dimensional is completely out of step with today's reality.

Vertical stability in the new pricing scale comes mostly from time, as it does not retrace, and volume, where its increment is small and/or where its distribution is imbalanced. Price stability in most instances cannot be derived from a pricing scale that is imbalanced by any series of continued entries. Past or new prices under differing imbalances just do not equate as imbalances are not equally related to volume/time or independently working supply and demand forces. Today, a trader must work with all elements instead of just one, and while this may appear to be cumbersome, the economic opportunities can be defined as being separate and are vastly greater than those related to efficient pricing.

The present invention starts by offering a control panel that allows a trader to break down volume into visual workable increments, and to re-set the system either manually or automatically or to clear and remove all traces by reinserting the accumulated data from the normal course of activity. The present invention also offers a visual side-by-side view (when attached instead of being integrated into the front-end) of both these volumes, which allows for lighter volume increments to be defined along those that have accumulated—the latter being the normal display from an active front-end engine. While the prior art displays offer access through its pricing array and mouse functions, the present invention allows for selected volume increment increases to trigger a trade or access at the discretion of the trader.

In accordance with one aspect of the present invention, volume numbers themselves are normalized by dividing the largest number by an adjusted percentage of itself—leaving it to be a highest volume number, and by reducing the clutter of the entire display by dividing all other volumes by the same divisor. This allows for new volume to be placed within the range where the effect of that price-quantity increment can be assessed. The display can be continually restarted and, after a given time period such as for example a fifteen second hold, the present invention will begin to allow the held as well as new volume to display. In this manner the new and old are combined—the old normalized and the new allowed in without being filtered, which allows for an integrated view related to inclusion and/or separation with a bias toward the present. The restart then takes the new high-volume number from the display and adds it to its accumulated base, which forces a more compressed scope of market activity as the first and second reductions are brought together. The display can be restarted continually for as long as the trader thinks it is useful, and at any time the trader can re-set by choosing to clear the system, which then defaults back to normal accumulation opposite each price. In another aspect of the present invention, the program clears the display and so that new volume can be catalogued according to time/volume or volume/time, which allows then a select scale of what has been termed the market-base distribution, which reflects the degree of entry imbalance related to the time or volume parameters chosen.

In addition, in accordance with the principals of the present invention a redact capability can be provided that allows an area of the display to be blacked out or lightened in way to distinguish that range from the remaining activity, to allow one to trade volume increments that increase by accessing the market directly through that medium. Redacted areas when invaded by trade activity or a confirmed trade will change to for example a lighter color showing actual volume at those prices versus being totally blacked out where not invaded. By increasing the depth of field of redaction to include many more coded colors, it is possible to offer varied trade access by selection, and when invaded or within a pre-set tolerance related to increased volumes, the same lighter color will serve as confirmation. The redaction systems are available by mouse functionality and create color codes related to basic redaction capabilities as well as usage functionalities related to access. Thus, an electronic trading display in accordance with the principles of the present invention provides for such delineation, enabling a trader to look at things separately and distinctly for analytical purposes, and to access the market in varied formats related to volume increases related to the pricing scale. Volume as an entity will increase before price change or be the catalyst for such activity.

The control panel of the present invention offers several methods of volume redaction where a volume is blotted out and then reappears when the increment increases. The redact buttons can be activated by a mouse function and are color coded, and just beyond these initial redaction colors are colors that allow a trader to buy or sell an increase in volume at selected prices. The redaction units can be coded to include these functions by simply clicking to a color that offers either immediate access (single increment of change) or to a color that offers more of a usage tolerance. In this manner, the trader is gaining much faster access than price—a long time goal of most trading systems.

The use of redaction allows for the closure of part of the trading range related to future use and is supported by the one-dimensional nature of markets today. Redaction makes high prices appear low and low price appear high as range reduction forces a much closer look at the remaining market activity. Redaction offers a wide array of uses in that it can define past areas, support vertical stability, provide tolerance zones, etc., and extension into their depth of field will allow trading access into volume increments by set definitions, which allows faster access than pricing as volume in most instances will change before price.

The volume display of of the present invention can allow for further definition of the pricing scale in that a related number less than a selected standard will appear in the display as a preselected symbol such as for example a "X" thus helping to define that particular part of range activity or opening up pricing areas that are showing specific imbalanced areas within the vertically structured pricing scale. Also, either manually or by automation, price or prices that appear in series or singularly can be looked at as an outlier— where prices are imbalanced as to usage on surrounding sides, which normally yields to immediate one dimensional activity or serves as an area of vertical stability.

The basic unit of imbalance is one-half of a normal distribution or less than that, with an outlier trade being the total extreme. Instead of seeking outside pricing parameters of a potential high or low, the market now seeks an immediate volume level that then serves as a foundation for development. The market will trade mostly on one side of this volume as it seeks trade support, and this can be shown in trading volume feathering out to nothing at that extreme. The overall market is made of innumerable number of these distributions that resemble a fishhook—the base volume being the hook area, and the distribution portion resembling the shank portion of that fishhook. These smallish distributions will be on both sides of the market—some to the upside and some to the downside, and some large and some small, some fast and some slow. These smallish distributions can be separated by space or can by default be joined together in what appears to be normal distribution pattern. Most often these units are completely independent as they are made up of entry imbalances, and through control panel access parameters can be scaled from a bare minimum to an outsized maximum for presentation.

The volume display of the present invention relates to isolation of time and/or volume within set parameters with each being supported by the other element. These data programs can be selected to run up to six consecutive units unless cleared and create a colored range which represents the area in which they were operating. The control panel allows for sequencing up to a given number of times, for example six units, and when volume is chosen, the time slot will keep track of the time used, and when time is chosen as the isolation parameter, the volume slot will show that volume. The colored range serves as a compressed vertical scale within the developed pricing scale as the data (time and volume) expands or contracts within it during the requested sequence related to the parameters and sequence chosen. Any part of an already constructed range can be isolated by coloring, which helps define the different volume related to the differing time zones of market participants or for any other purpose.

Price discovery long thought to be a prerequisite of the market now resides within the trader for a particular and singular purpose rather than a general one for multiple users. Instead of carrying a neutral gene, prices represent a one-dimensional format where an advantage goes to either the buyer or seller related to future pricing levels, but not to the immediate transactional price as both individuals came to an agreement related to fairness. The breakdown of volume into increments at any time allows for entry imbalances to surface on the screen, and for the trader to grow accustomed to and become familiar with them. The markets are defined by imbalances today, and these imbalances are distributional in nature and create supply availability variances related to future prices. The order flow coming from those already in the market has tremendous influence going forward as there is more of an immediate need for closure than those wanting to initiate new trades. Overall, the markets are balanced in that for every buyer there is a seller, buy and sell volumes are equal as are the pay and collect dollars. It is the distribution of volume within that overall balance that is imbalanced due to holding times, outlier trades, etc. that effect access availability into the future.

Overall, an electronic trading display in accordance with the principles of the present invention allows fresh insight to trading itself, and offers an understanding related to known economic statistical properties of distributions, which are more representative of market development today. The use of the reset application would potentially allow a separation of volume on perceived up- and down-market movements so that those differences could be exposed. The data point comparisons available are many, and if one holds each trader-made segment in history, the data points multiply to the limits of one's imagination. New forms of technical analysis are more volume and time based versus those formats that just use price alone. The move of this data to off-line display areas offers options that are not limited to existing space.

In a preferred embodiment, the normalized volume number can be created by dividing the largest number by 1% of itself plus 0.1% (or 1.1%), which defaults it to 99. For example, if the highest volume number was 1,400, then 1,400 would be divided by 14.1 to yield 99.29, which would then default to 99. Other numbers are divided by the same denominator—which produces quotient numbers that are less than and define the margins around the focal point of highest volume number(s) or those out of sequence. Following this same example, a volume number of 1,000 would be divided by 14.1 to yield 70.92, which would then default to 71. In this preferred embodiment, the scaled numbers are displayed in the same position where volume is currently posted in existing trading systems. Suppression rates (divisors) and their relationships can be stacked at the extremes of this range, just posted as are price highs and lows are now, or held in a display window of a control panel. A new suppression rate will be used at each restart—that is, the highest new accumulated number within the field will be the basis for the divisor selection upon reset, and when restarting, it will be the accumulated highest number. The initial sequence suppression number then will illustrate by comparison the degree of change and serve to illustrate separation due to its distance from the new base and the rate of suppression used.

Set forth below is a non-limiting example of an implementation of an electronic trading interface in accordance with the principles of the present invention.

Referring to FIG. 1, a non-limiting example of a hardware infrastructure that can be used to run the system of the present invention is seen. This hardware infrastructure provides connectively between exchange centralized (host) computers 3, one or more computer networks such as the Internet 5, and exchange participant's (client) computers 7. The operations of the host exchange typically include order matching, maintaining order books and positions, price information, and managing and updating the database for the online trading day. The host exchange is also equipped with external interfaces that maintain contact to quote vendors and other price information systems. Using client devices, market participants or traders link to the host exchange through one or more computer networks.

The infrastructure can include but is not limited to: wide-area network connectivity; network infrastructure; an operating system such as for example Redhat Linux Enterprise Linux AS Operating System available from Red Hat, Inc., 1801 Varsity Drive, Raleigh, N.C.; appropriate network switches and routers; electrical power (backup power); network backup hardware and software. The match engine and administrative applications server can run for example on a Dell PowerEdge 2950 server with Single Processor, Dualcore Intel Xeon 5140 with 2.33 GHz, 1333 MHz FSB, 4 GB of RAM, 2×146 GIG Serial Attached SCSI Drives, Raid 1, available from Dell, Inc., One Dell Way, Round Rock, Tex. 78682. The database server can be run for example on an Dell PowerEdge 2950 server with Single Processor, Dualcore Intel Xeon 5140 with 2.33 GHz, 1333 MHz FSB, 4 GB of RAM, 2×73 GIG Serial Attached SCSI Drives, Raid 1, also available from Dell, Inc.

Figure 2:
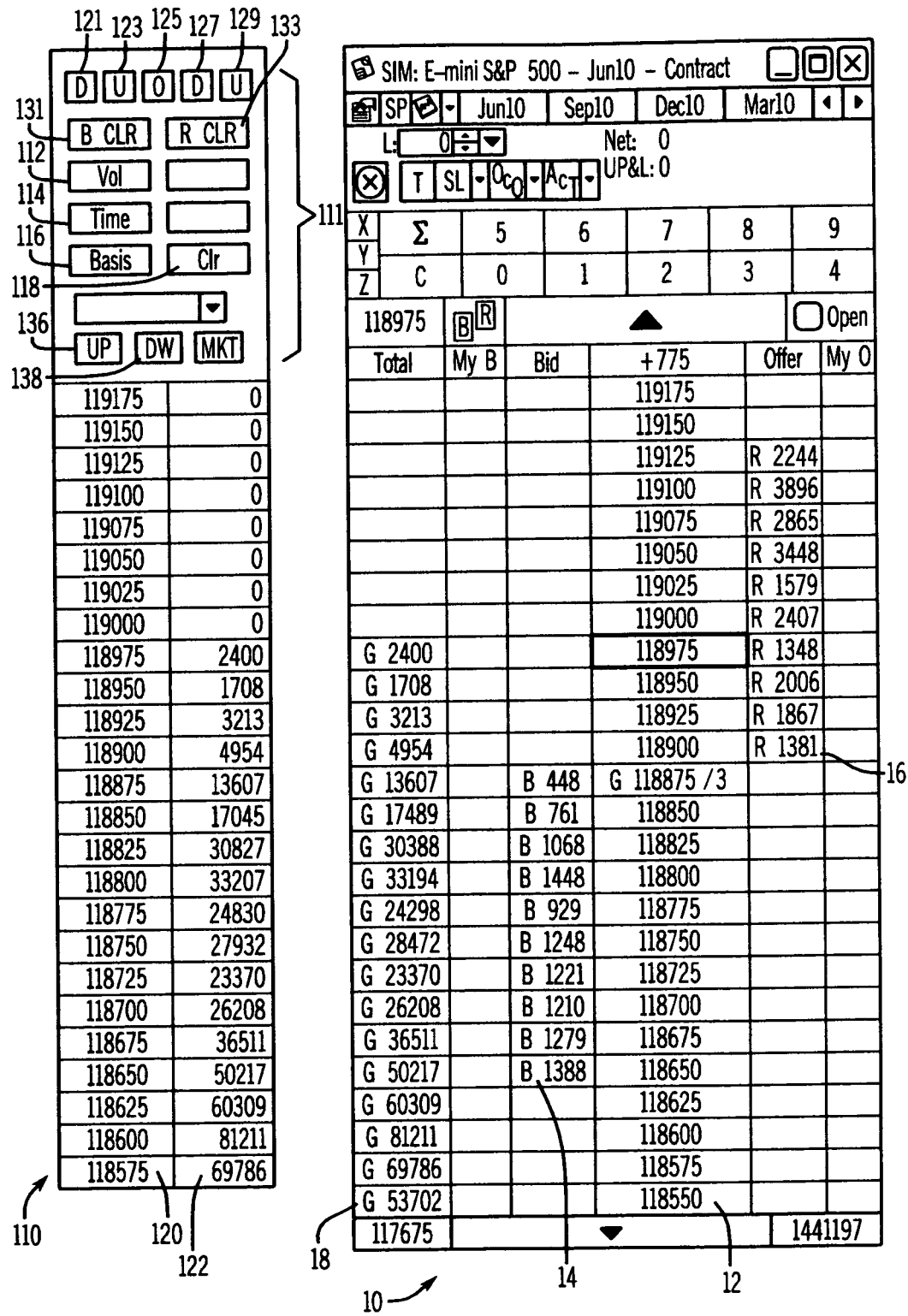
FIG. 2 is a screen shot of an example electronic trading interface on which an electronic trading interface in accordance with the principles of the present invention can be applied with an example electronic trading display of the prior art.

Referring now to FIG. 2, a screen shot of an example electronic trading display 10 of the prior art is seen. While in the example depicted herein a June 1010 Contract for an E-Mini S&P 500 stock market index futures contract known by the commodity ticker symbol "ES" and traded on the Chicago Mercantile Exchange's Globex trading platform, CME Group, 30 South Wacker Drive, Chicago, Ill. 60606 is shown, the present invention is applicable to a plethora of financial instruments. This example prior art trading display includes a column of prices 12 with the bid quantity 14 and offer quantity 16 displayed in columns next to the price column 12 and aligned with the corresponding bid and offer prices. This example prior art trading display also includes a column 18 of prices aggregate volume traded for the electronically traded contract since the market opened. The display 10 shows market depth on a vertical plane, which fluctuates up or down across the plane as the market prices fluctuates. The display also provides an order entry system, market grid, fill window, and summary of market orders.

FIG. 2 further shows an example electronic trading interface 110 on which a trading interface in accordance with the principles of the present invention can be applied. While the example trading display 110 of the present invention described herein can be implemented as a parasitic system off of an existing trading display 10, a stand alone system or indeed any implementation of in any environment is within the scope of the present invention. The present invention initially displays a control panel 111 containing controls for volume functionality 112, time functionality 114, and basis functionality 116. A trader activates the system by clicking on the respective button and uses the open windows for setting parameters. The volume functionality and time functionality automatically re-set upon reaching a set goal. A clear button 118 brings the trader back to the starting point inclusive of all natural data accumulated at that point. Additional clear buttons 131, 133 clear each form of redaction. Left clicking over a cell of volume can redact both the volume and price cell to for example blue. Double clicking can generate a different color, for example red. Continuing to click toggles back and forth between for example blue and red. Clear button 131 clears the first redacted color while clear button 131 clears the second redact color. The vertical part of the display has price column 120 and volume column 122 for each unit of activity on a vertical scale reading from top to bottom; of course, orientations other than vertical can be utilized. For depth of field redacting, the control panel can use the clicking medium on the right redact button to reach all the different colored redactions that serve to allow trade access.

A series of buttons provide the ability for the trader to align the price scale of the electronic trading interface 110 with the price scale of the example prior art trading display 10. These include a "fine adjust down 1 pixel" (when the mouse is scrolled over the button this text can be displayed) button 121; a "fine adjust up 1 pixel" button 123; a "zero all adjustments" button 125; a "coarse adjust down 1 row" button 127; and a "coarse adjust up 1 row" button 129. Scrolling up or down the appropriate buttons allow for vertical disengagement of the two programs and the "mkt" button brings them back into alignment.

Figure 3:
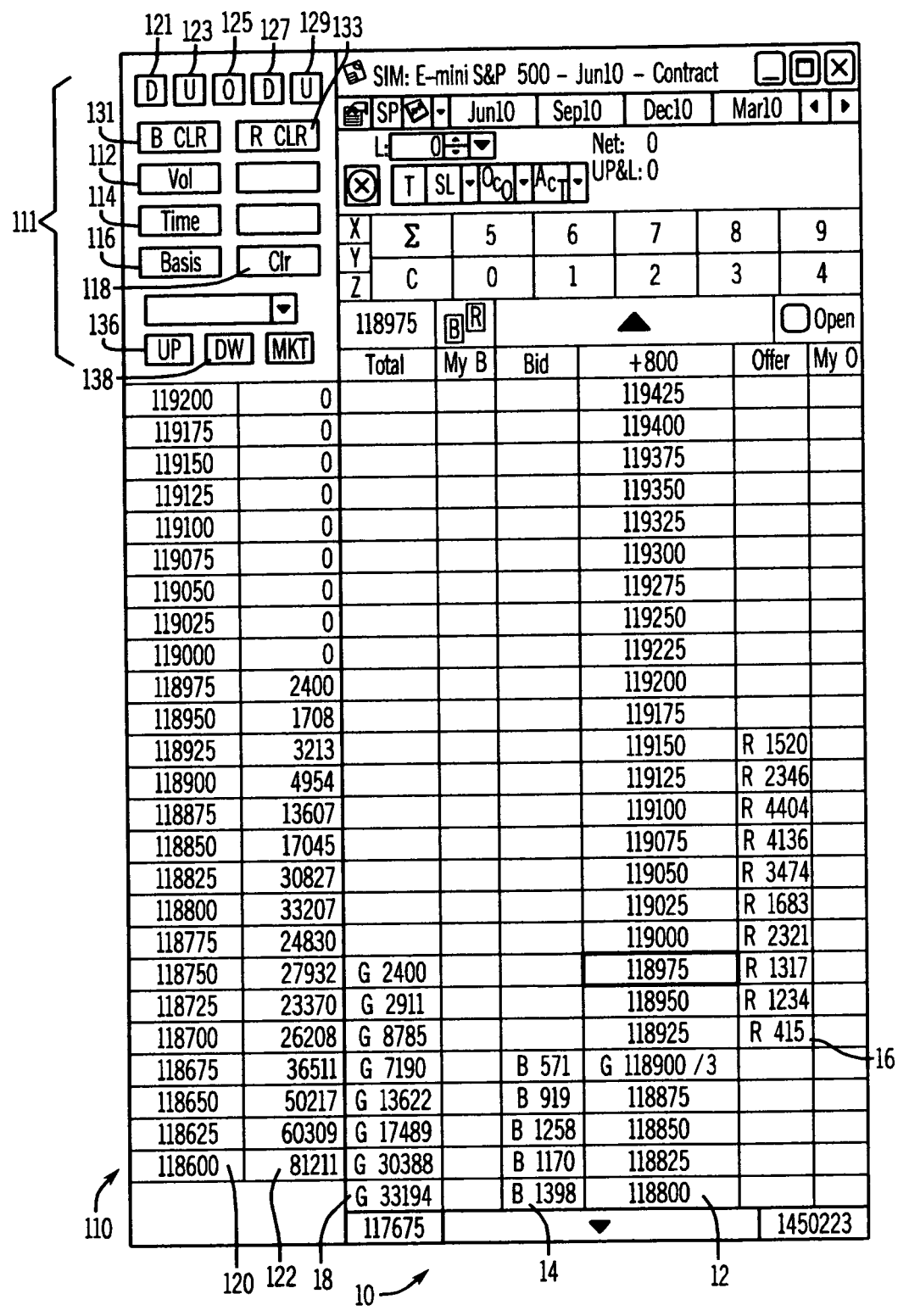

Referring now to FIG. 3, a screen shot of the example trading display of FIG. 2 is seen with the trading display 110 of the present invention aligned alongside the front-end price array 10. In FIG. 3, the pricing information of the trading display 110 of the present invention and the pricing information of the example trading display 10 of the prior art are misaligned. The two are merged so that the pricing scales are opposite each other. Referring now to FIG. 4, a screen shot of the trading display of FIG. 3 is seen showing an alignment of the pricing information of the trading display 110 of the present invention with the pricing information of the example trading display 10 of the prior art. The trading displays 10, 110 have been aligned by use of the up/down buttons 136, 138 on the control panel 111; the alignment need not be exact, but is sufficient to integrate the displays 10, 110.

Figure 6:
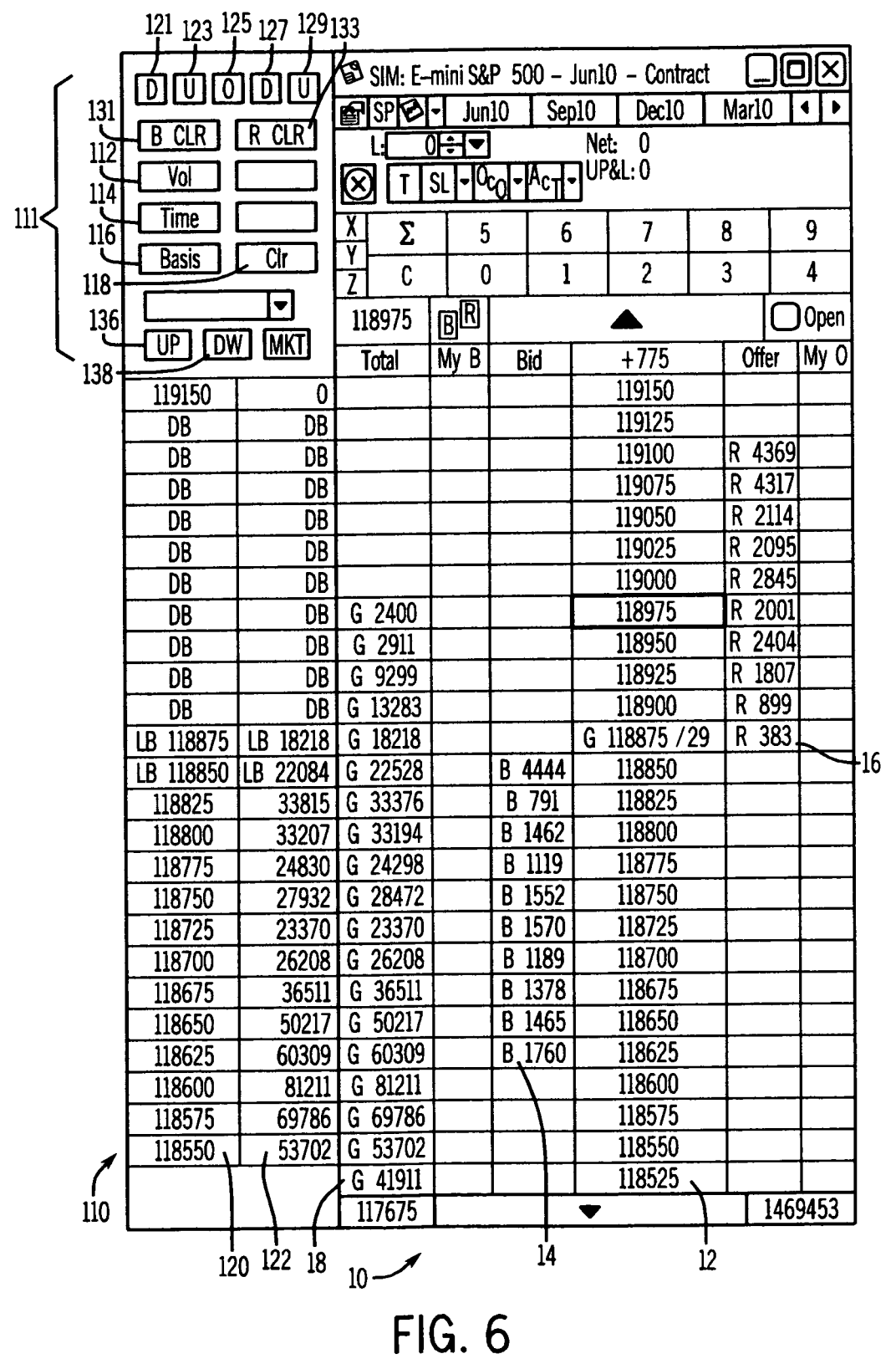
Figure 7:
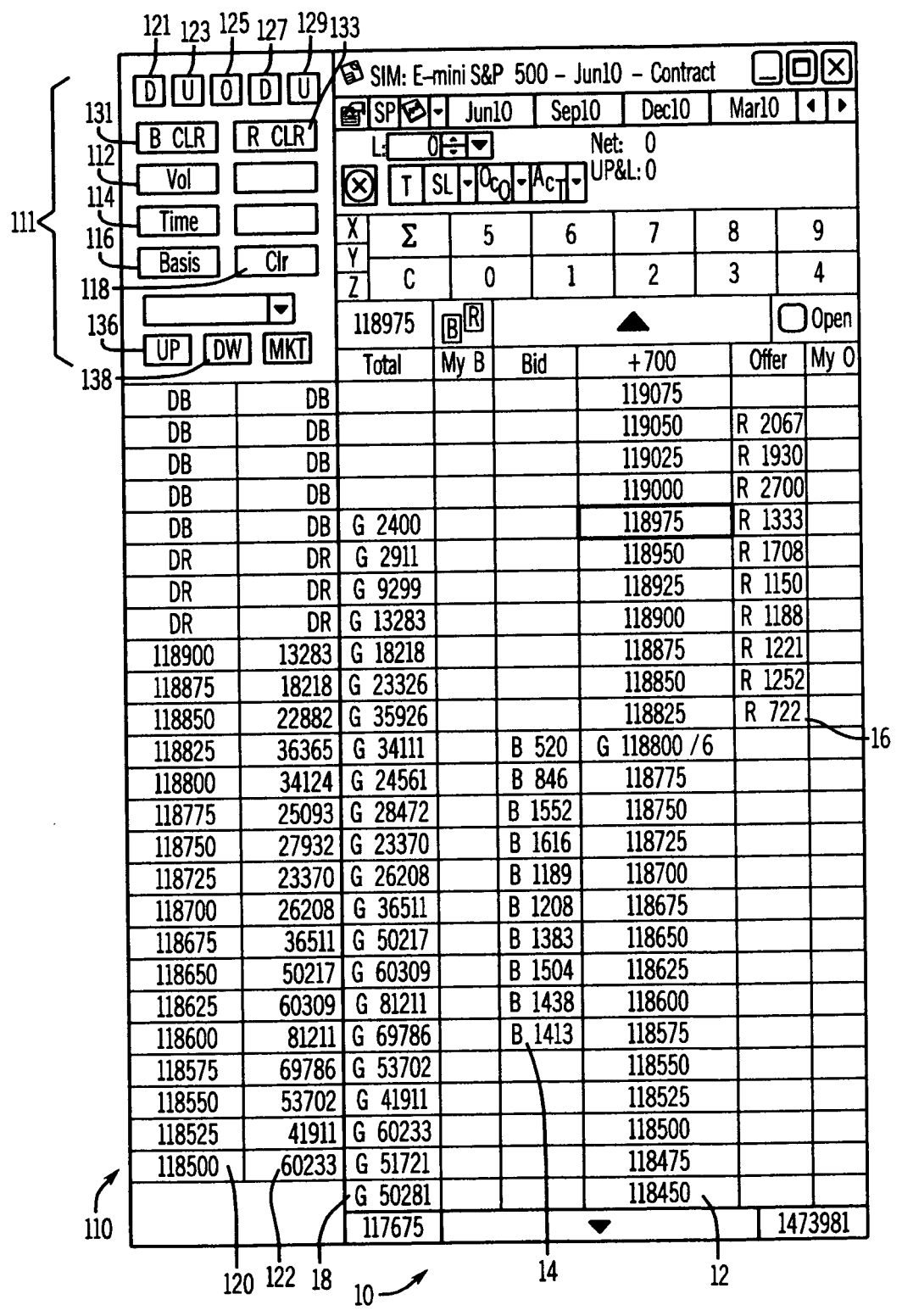

Referring now to FIGS. 5-7, screen shots of the example trading display of FIG. 2 are seen in conjunction with the redaction feature. FIG. 5 shows the pricing scale redacted from the price of 11900 to 119125—redaction can be accomplished by clicking once on a price, in this example blue; a second level of redaction can be accomplished by double clicking on a price, in this example red; and both can be cleared independently by using the respective buttons 131, 133 on the control panel 111.

Referring now to FIG. 6, a screen shot of the example trading display of FIG. 5 is seen showing new activity in redacted cells. FIG. 6 shows the redacted level having been extended down to 11850, and that the market has traded into that territory by two price increments as the colors have been lightened to reveal actual volume at those prices.

Referring now to FIG. 7, a screen shot of the example trading display of FIG. 5 is seen showing the double redaction feature. FIG. 7 shows two forms of redaction as distinguished by color—in this example the first color blue and the second color red, with the last three redactions being different from those in FIG. 6. This allows for tolerance levels to be incorporated into a trader's screen shot relating to redaction as redaction then can be light or heavy related to one's view.

Figure 8:
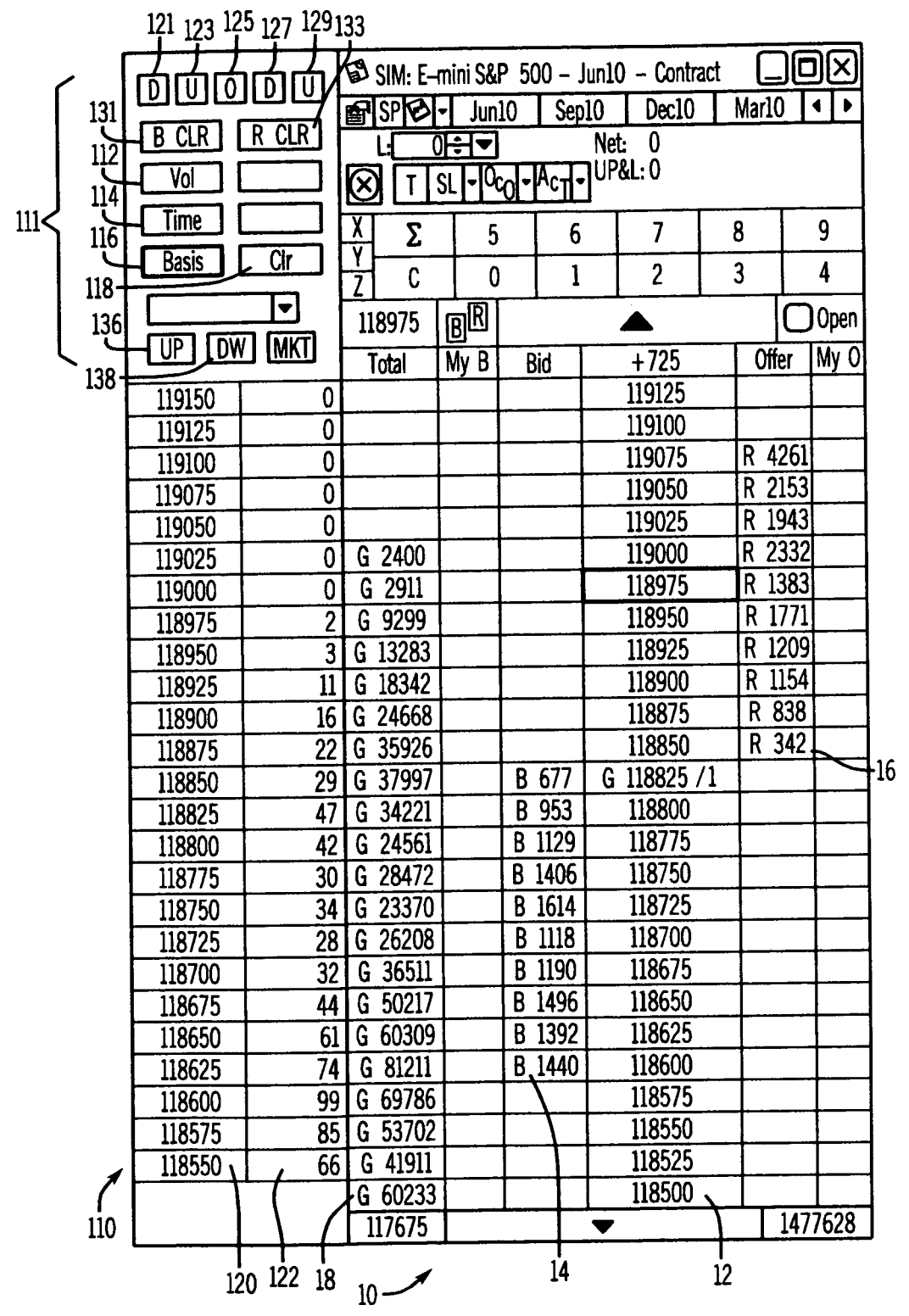

Referring now to FIG. 8, a screen shot of the example trading display of FIG. 2 is seen in conjunction with the basis trade feature. FIG. 8 shows the volume having been reduced on the basis program and some disparity of pricing alignment between the two systems as the present invention freezes the display for example for 15 seconds and then resumes with held volume being applied where it took place. The high volume number is 118600 which can be seen as the normalized "99" and will be color coded such as red to distinguish it upon resumption of the system, as seen in FIG. 9

Figure 9:
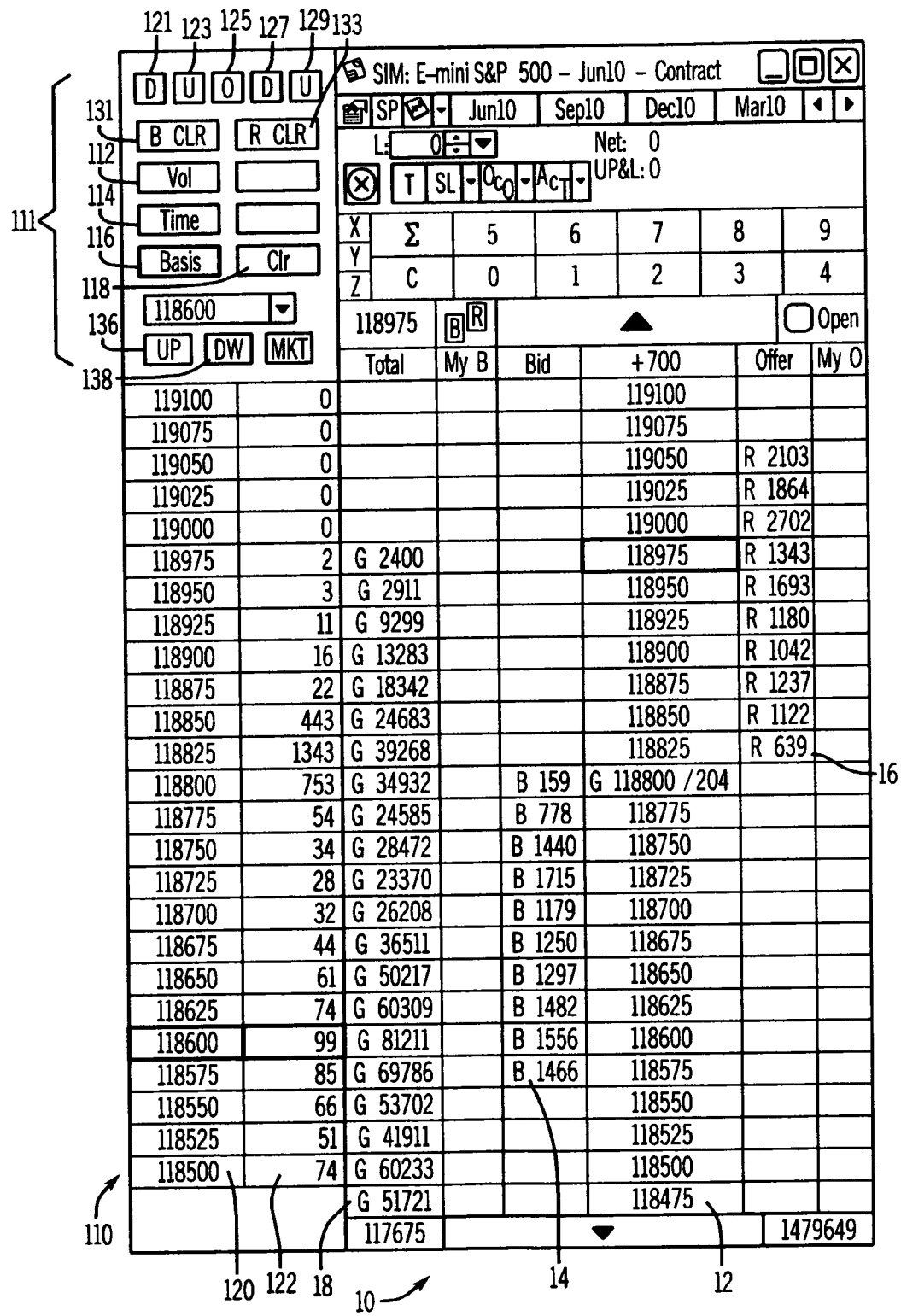
Figure 10:
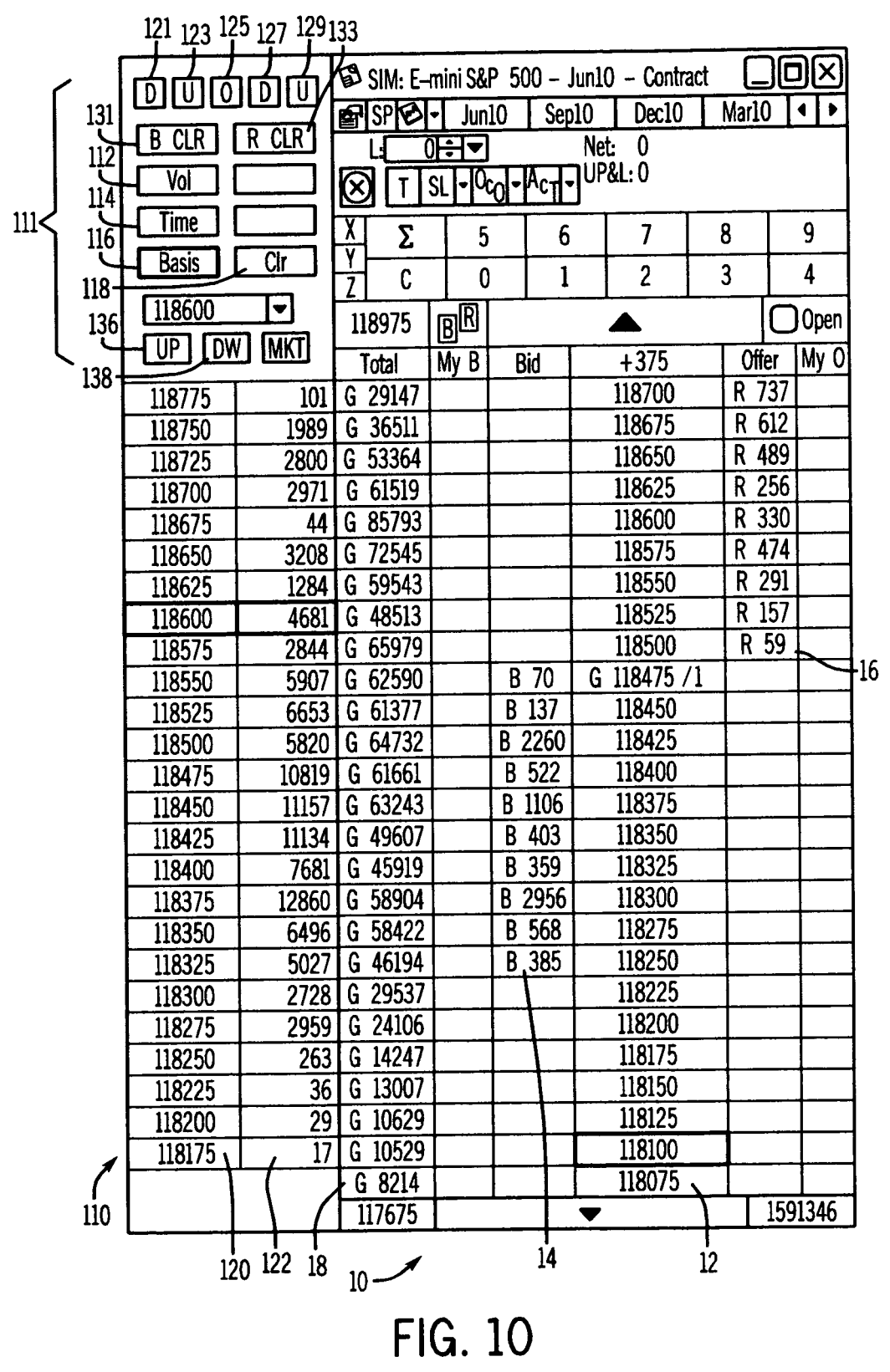

FIGS. 9-10 show screen shots of the example trading display of FIG. 2 in conjunction with the overlay feature of the basis program. The high volume number at 186000 has been color coded such as red, and trade has resumed incorporating new volume into the display, which has been designed to supersede the normalized values. The new and old volume will show some degree of overlap or some degree of separation, and in this example it shows more overlap as the data is contained within the range of normalized numbers. Note, 118600 has been catalogued in the bottom window of the control panel 111; as the system is re-started, it will show these numbers in progression. FIG. 10 shows the divisor number when the cursor is placed upon the high volume number—the higher the divisor, the more default liquidity is present and vice-versa for lower divisors as the divisor depicts how prices are moving through time.

Figure 11:
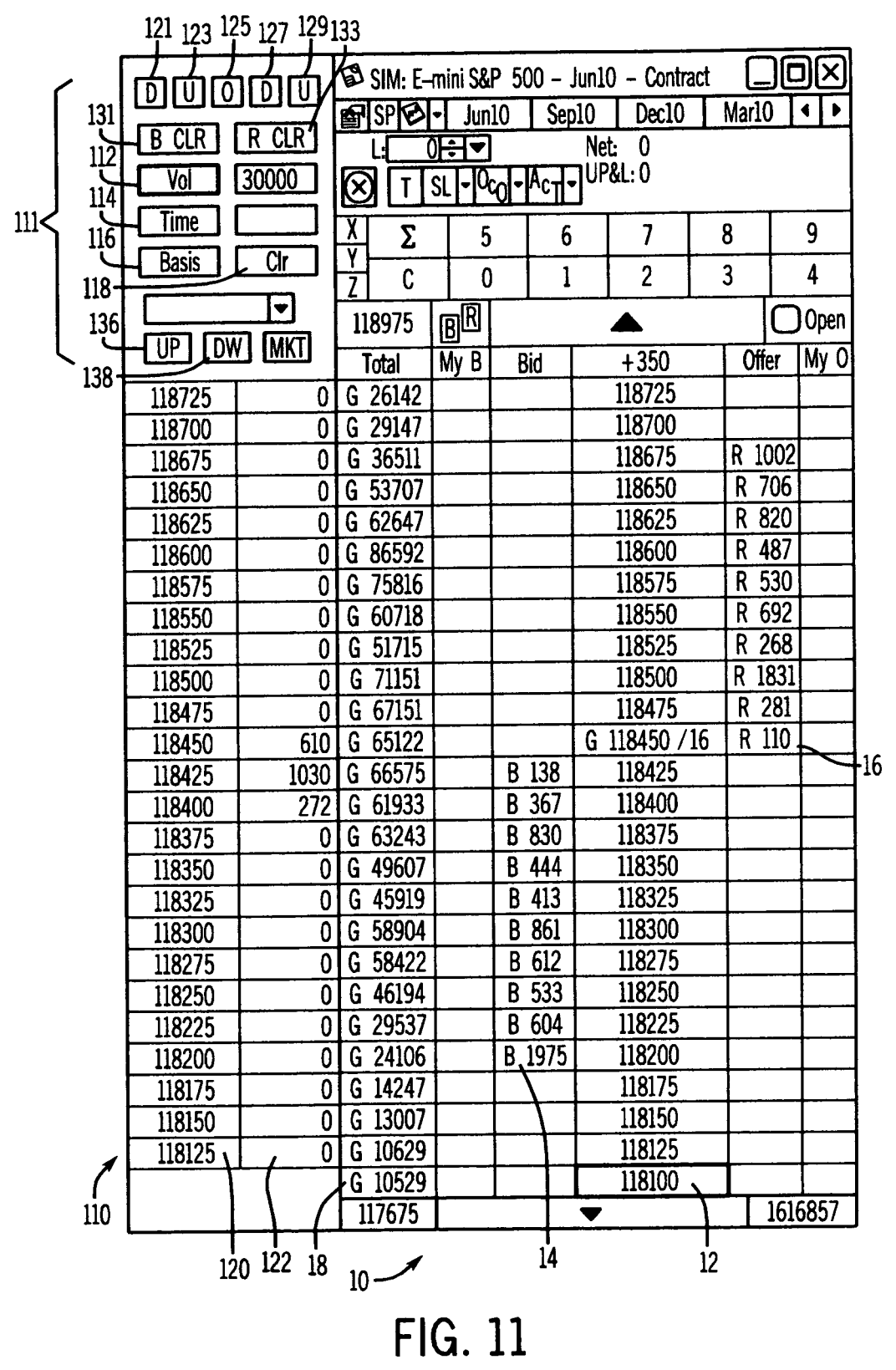
Figure 13:
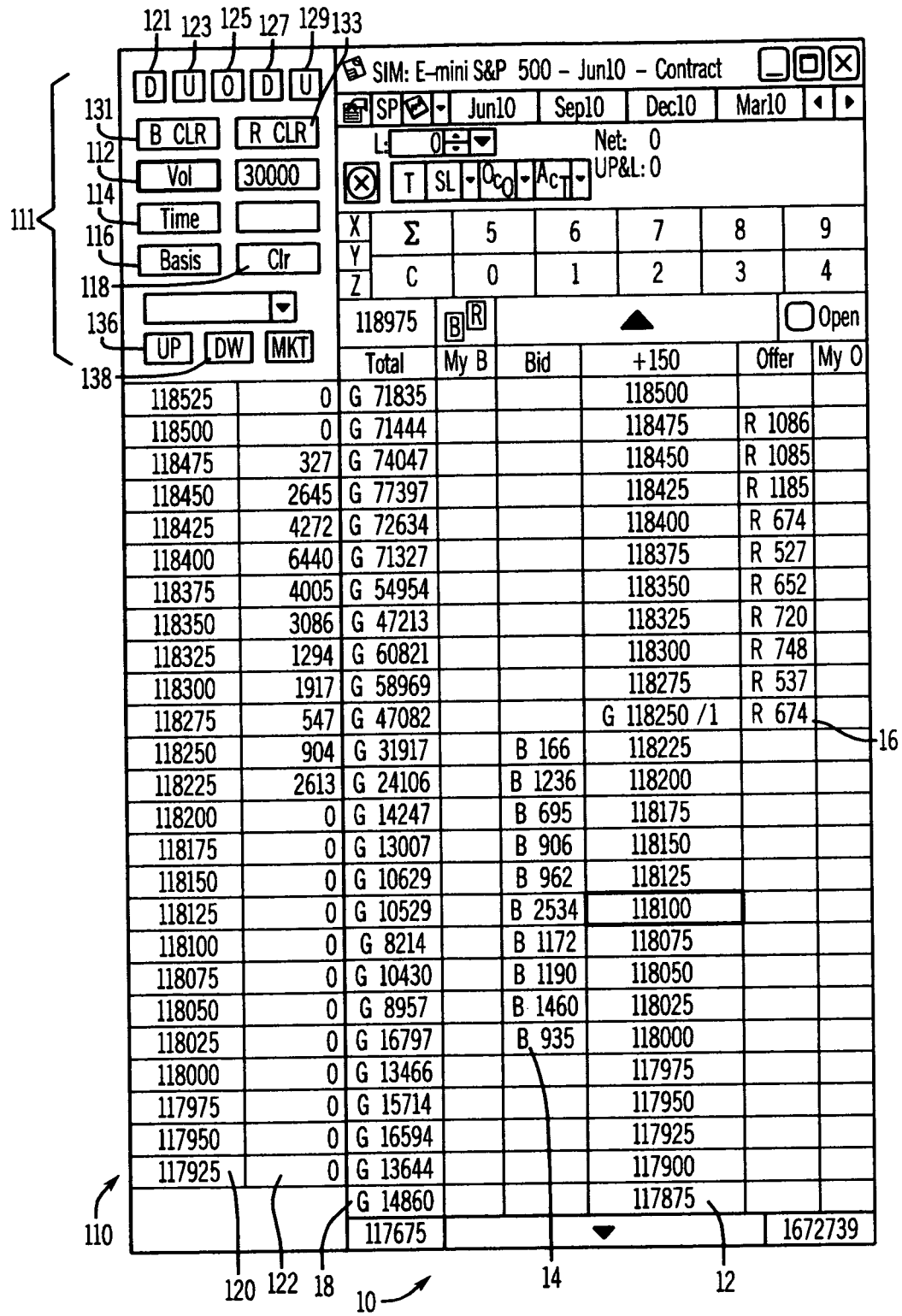

Referring now to FIGS. 11-13, screen shots of the example trading display of FIG. 2 are seen in conjunction with the volume request. FIG. 11 has cleared volume references from the screen and 30,000 contracts have been selected as the parameter. The initial stage of the distribution of those contracts is shown. A trader can try and find the optimum scaling number that represents a workable distributional base for that trader's style of trading, and use the system to enter/exit trades. The speed at which the goal is reached is important, as is its overall range, as well the size and distribution scale related to its highest volume base. In FIG. 11 the volume feature has just started.

Figure 14:
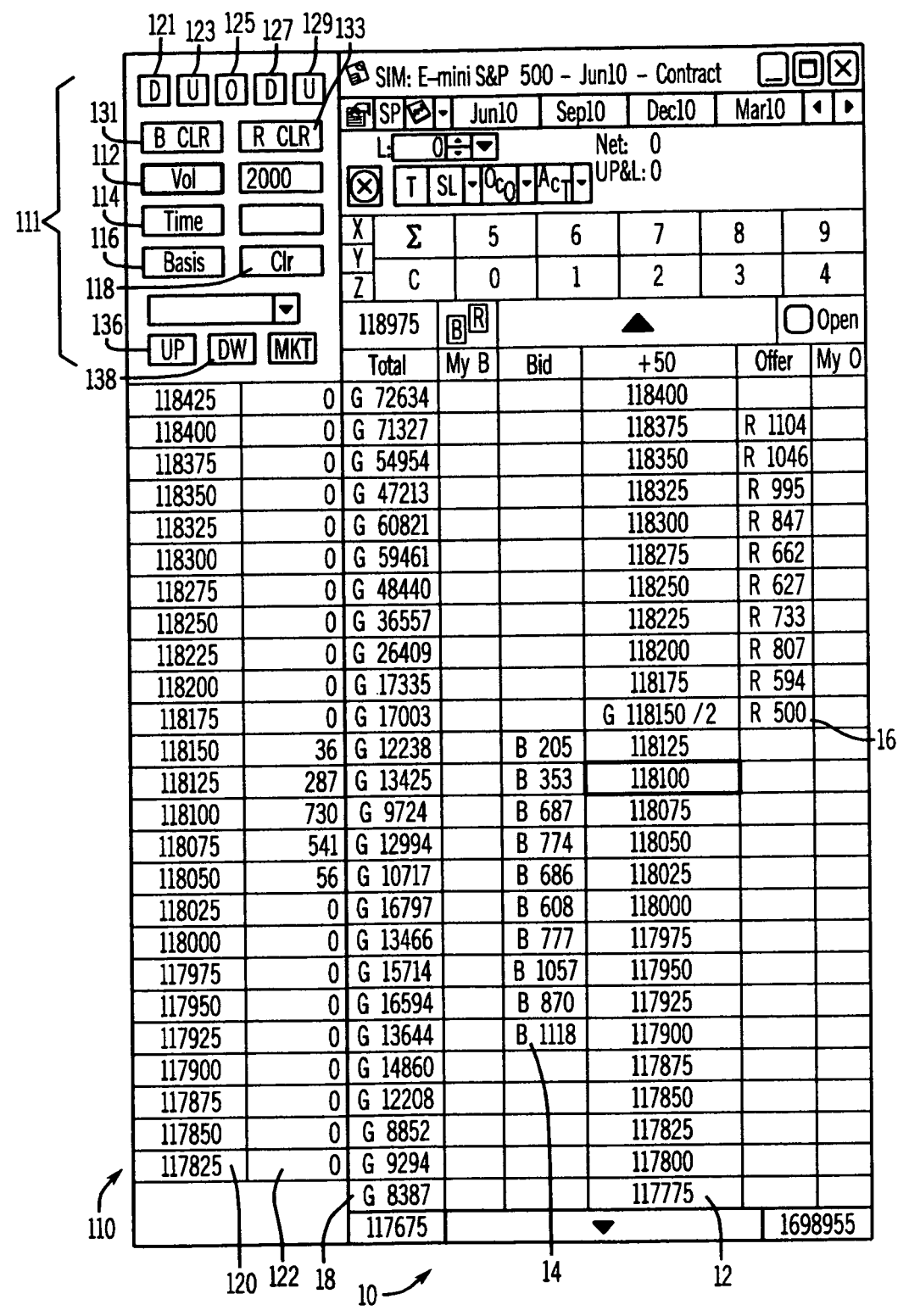

FIG. 12 shows an example of what appears to be a normal distribution related to FIG. 11. More of the distribution has evolved and it appears to be balanced around its high volume price, which offers little economic advantage. FIG. 13 shows an example of an imbalanced distribution of the volume feature. The screen shot of FIG. 13 also shows a new imbalance at the bottom of its range where the volume of 2613 is much greater than those immediately above it. The trader can reset the volume parameter for a fresh view or let things develop further. The data indicates a possible data separation from the initial distribution. If it remains separate, the data will form a new and lower distributive unit which is the most logical sequence Referring now to FIGS. 14-16, screen shots of the example trading display of FIG. 2 are seen in conjunction with a small volume request. The volume requirement has been reduced to 2000; thus a trader is looking for the speed related to completions, how may pricing units are used as well as the size of the high volume number—a single trade could reach or exceed the selected basis or there could be many trades that make up the goal. FIG. 14 shows five price units used and relatively balanced volume size and scaling, which would mean that a fair price area has been found. FIG. 15 shows a basis trade where separation of volume distributions is taking place—the half distribution base occurs at the low price of 117875 and the shank ends at 118025, and the higher volume at 118075 is the beginning of a new base which has separated from the initial one.

FIG. 16 shows a restart focusing upon the aftermath of the new conditions discussed in conjunction with FIG. 15. The separation did occur and the restart has brought almost the entire focus to that imbalance. FIG. 16 also shows that the new volume is completed as to its shape in that it contains the 99 number near the high end of the range. Note that the constant display of the matching engine volume shows that the market has entered into the low end of its rather high volume area ranging from 118250-118850 so one can expect default liquidity to overcome any access imbalance at this juncture and it also helps explain the completed shape related to the aforementioned distribution.

Referring now to FIG. 17, a screen shot of the example trading display of FIG. 2 is seen in conjunction with the earlier restarts of the basis programs. FIG. 17 shows the opened window depicting the earlier normalized "99" numbers—118600, 117875, and current 118350 with the latest one darkened as well as displayed in the default window.

Figure 18:
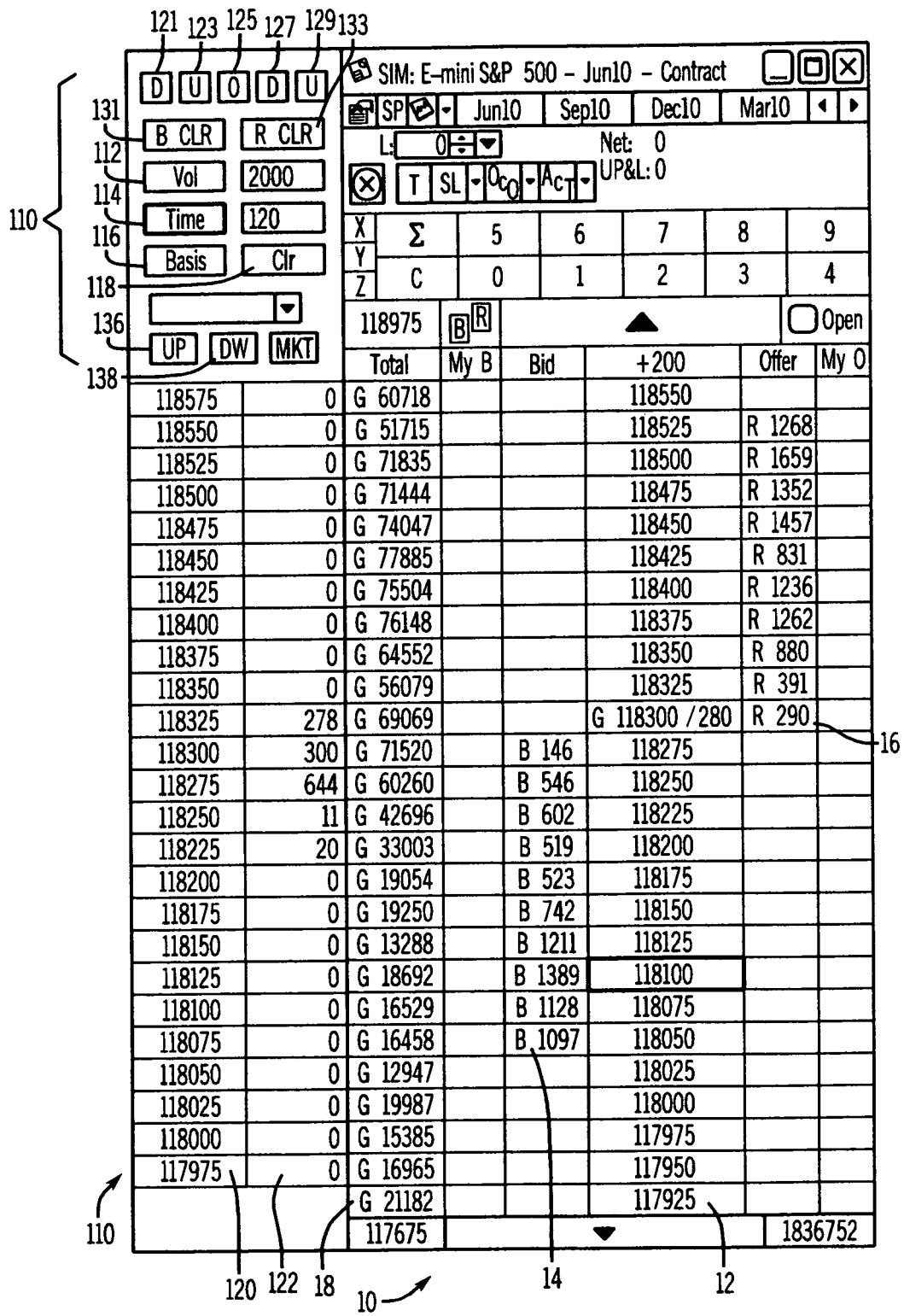
Figure 19:
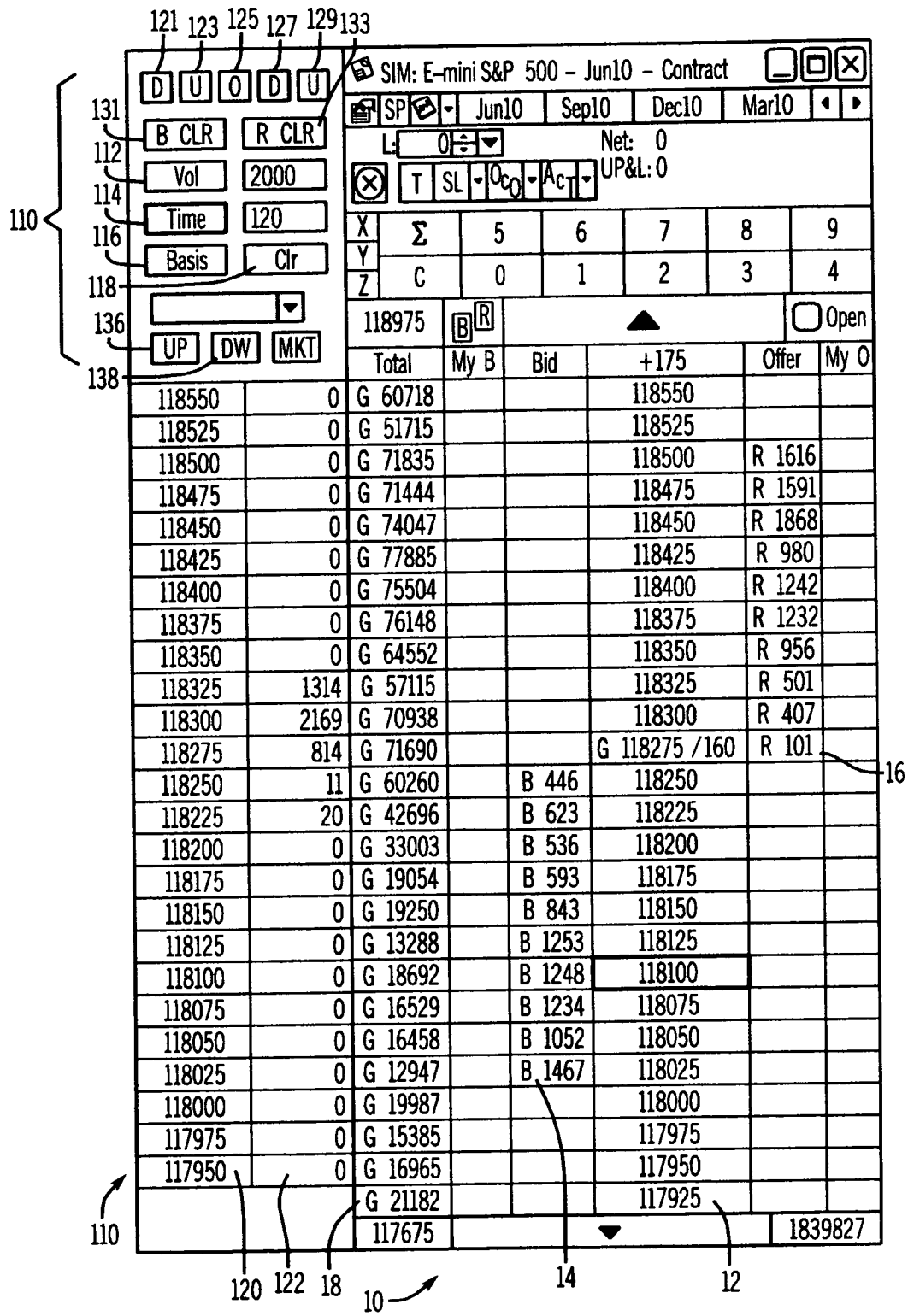
Figure 20:
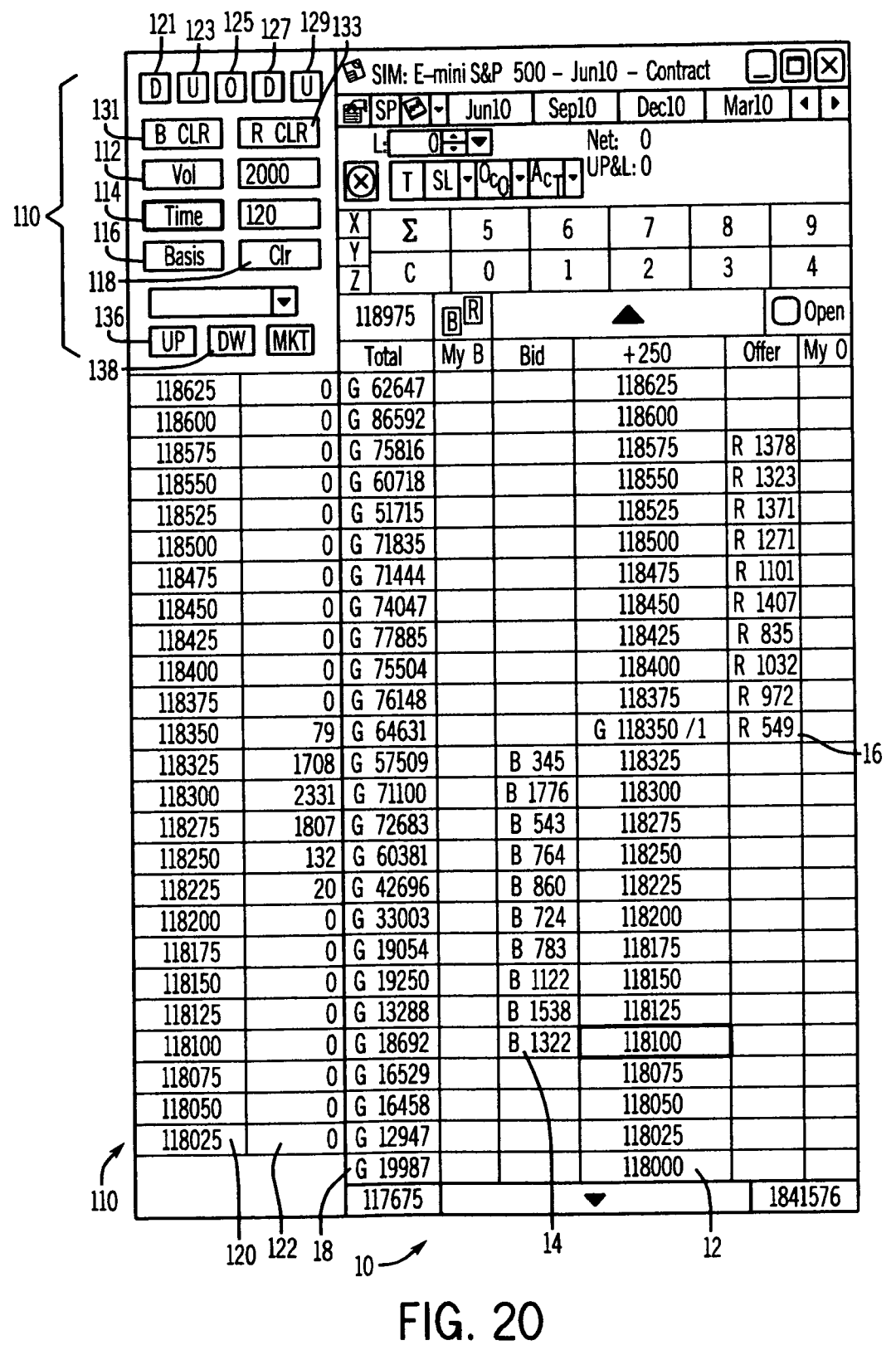

Referring now to FIGS. 18-20, screen shots of the example trading display of FIG. 2 are seen in conjunction with a time request for 120 seconds. The display has been switched from basis to one of time. In the described example, 120 seconds has been inserted as the ending requirement. When the 120 seconds are up, the system will restart automatically.

FIG. 19 shows an example of the timing feature after a little more time. In the described example, FIG. 19 is taken a little bit more into the 120 second standard and it is beginning to reveal the half-distribution that is normal to markets today—something that remains imbalanced rather than balanced. Again, FIG. 20 is a snapshot further along into the 120 second standard and shows more volume into the same range—this is a sign of maturity and the trader may want to restart or re-set the system by cutting short the 120 seconds in play. The trader can do this by hitting the time button again or by hitting the clear button.

Figure 21:
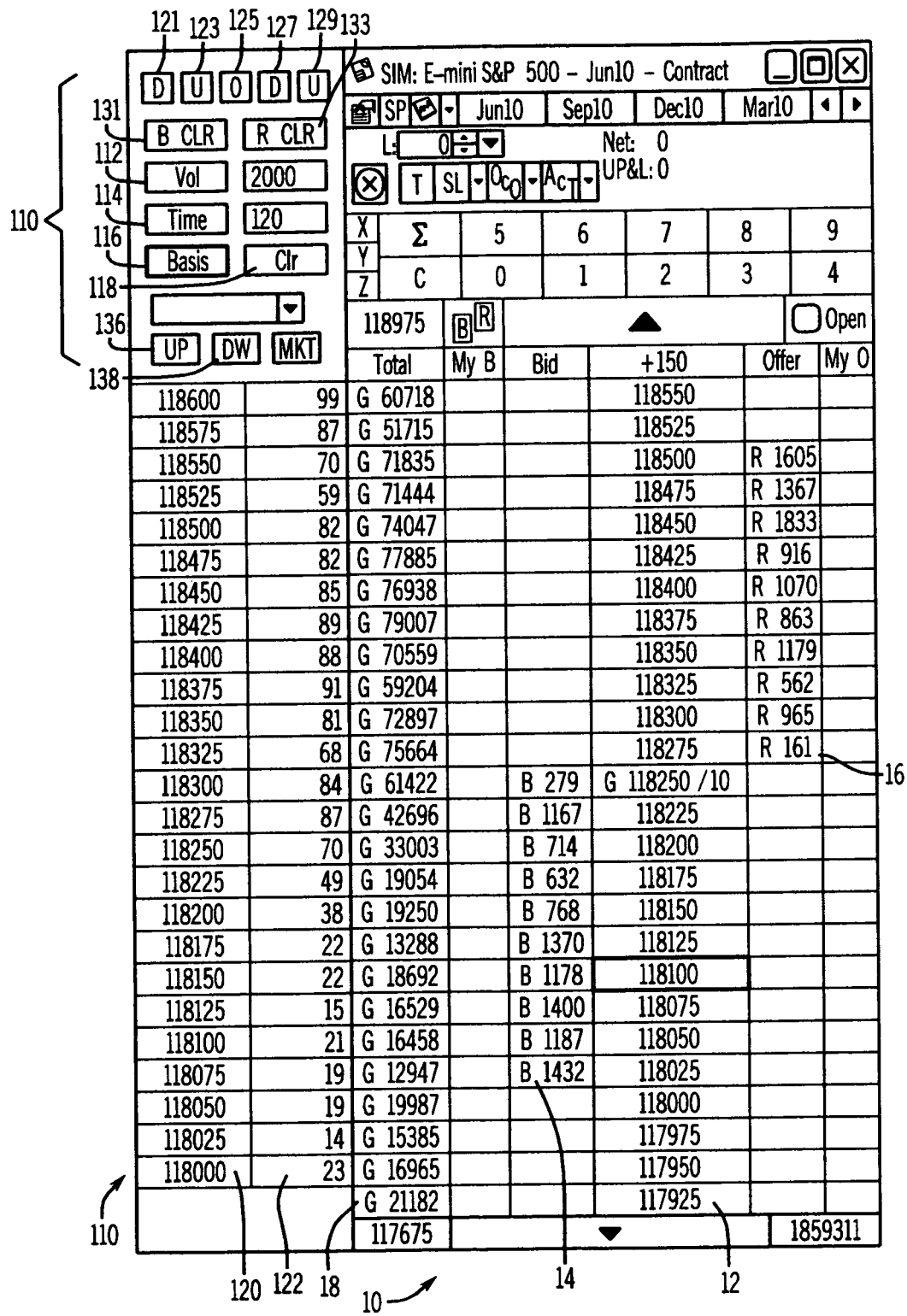
FIGS. 21 and 22 are screen shots of the example electronic trading display of FIG. 18 representing a start related to the basis system and how the volume prints after the delay.
Figure 22:
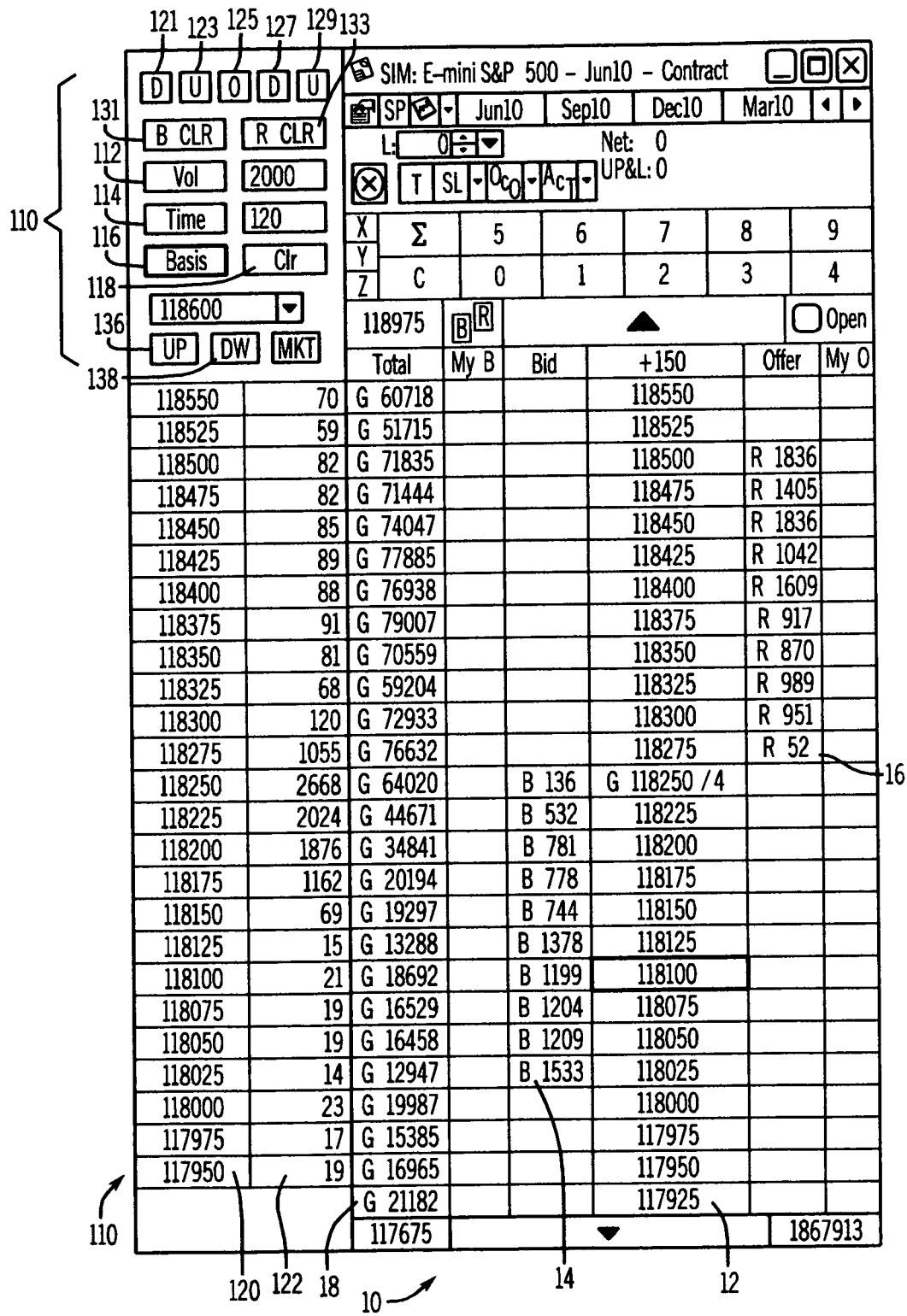

Referring now to FIGS. 21 and 22, screen shots of the example trading display of FIG. 18 are seen representing a re-set related to the basis system and how the volume prints after the delay. FIG. 21 shows a clean expression during the 15 second hold, and FIG. 22 shows the held as well as current volume as it occurs. FIG. 22 also shows that the basis or normalized "99" to be 118600 and that the volume coming is below that reference and is some what normal. Also note that the normalized numbers above and below the new traded area are reflective of those in the accumulated display—ranging from the 70-90 above and 14-23 below, which places the current volume at the low end of the base distribution. The reset of the data after FIG. 18 shows how flexible the trader can be to differing informational formats, rather than just accepting the whole as presented.

Figure 23:
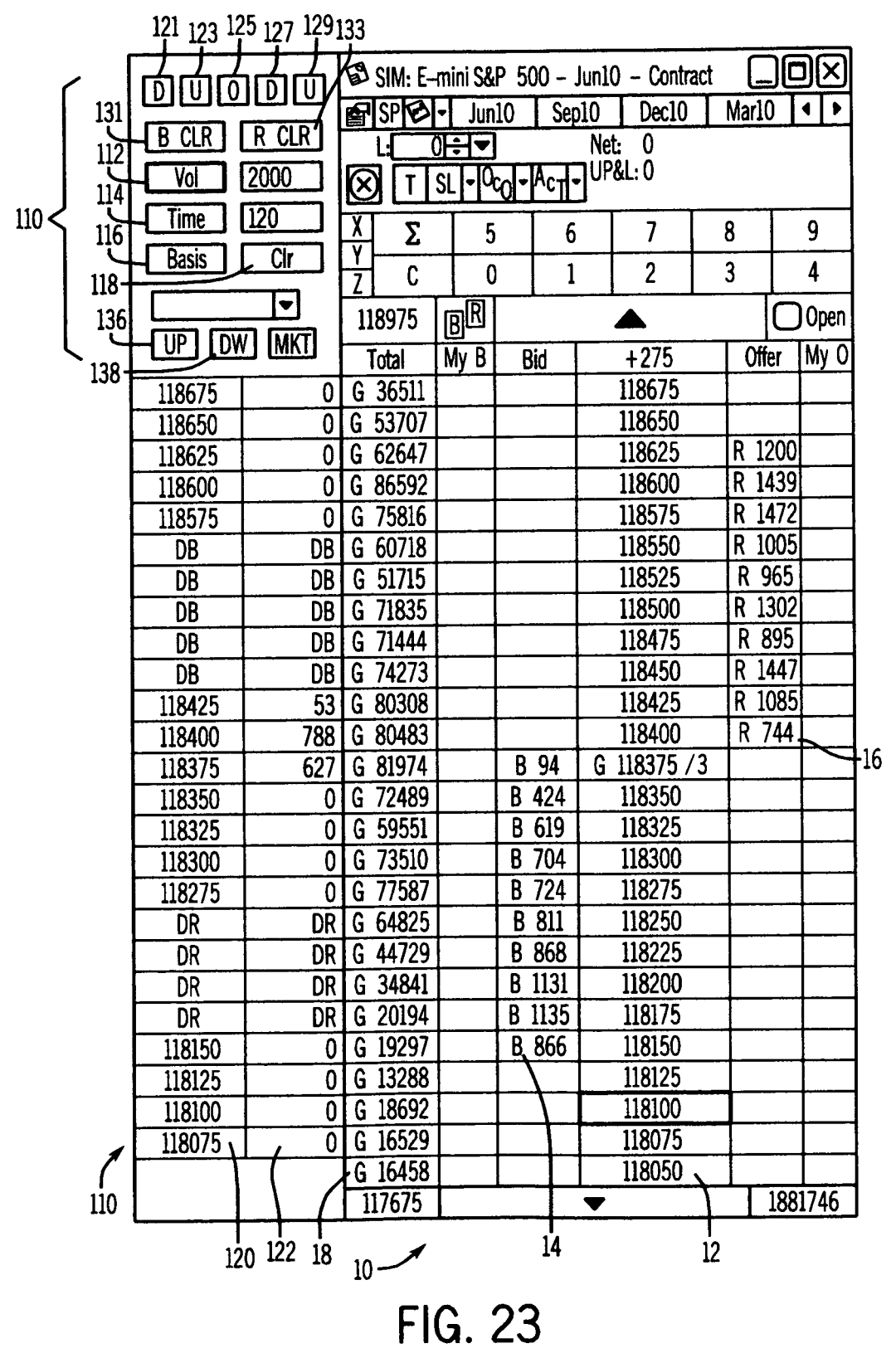

Referring now to FIGS. 23-24, screen shots of the example trading display of FIG. 2 are seen that combines redaction and a fast volume requirement of 2000 contracts by confining the output to being inside the set parameters. The range, volume dispersal, and the speed of completion can then be related to market direction as the system continually resets. FIG. 24 is taken after a few restarts of the volume program and shows that the market moved lower through the bottom redaction. A redaction was taken out and the market subsequently reset, so one can see the new volume emerging in an uncluttered environment. Markets today are more one-dimensional than in the past so it is important to set up the background so that those data parameters and trader match up can be aligned accordingly.

Figure 25:
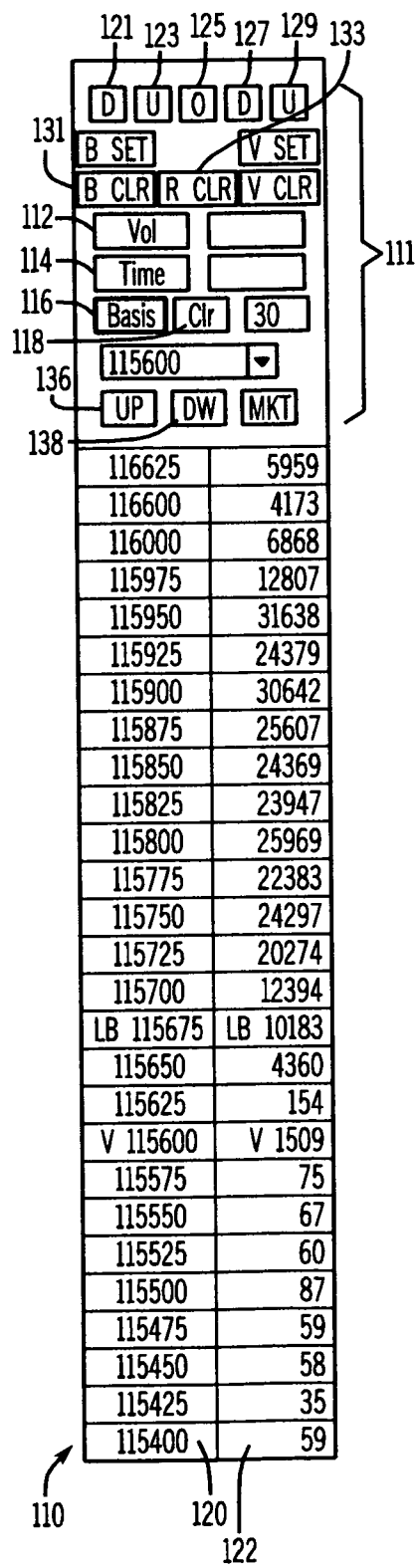
FIG. 25 is a screen shot of the example electronic trading display of FIG. 2 that shows the showing the basis trade feature re-set.
Figure 26:
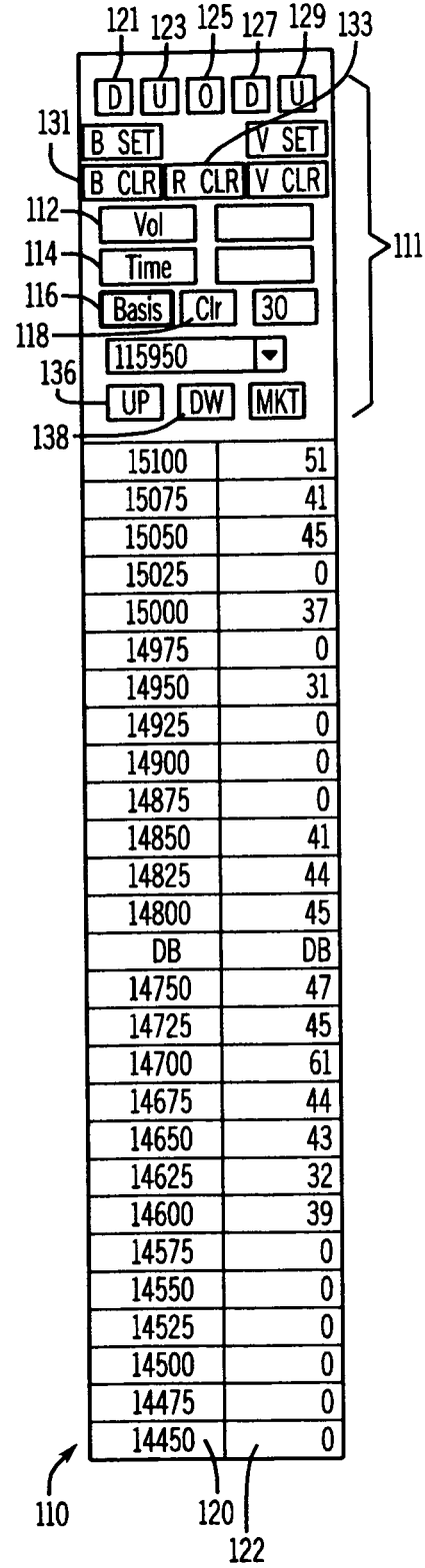
FIGS. 26-27 are screen shots of the example electronic trading display of FIG. 2 that show a request run with a minimum standard for display.

FIGS. 25-28 show the example trading display of the present invention in the absence of the example existing trading display; again, the trading display of the present invention can be implemented as a parasitic system off of an existing trading display, a stand alone system or indeed any implementation of in any environment is within the scope of the present invention. A trading display in accordance with the principles of the present invention can offer direct access to the market to the trader independent of the prior art, in which the current price can be designated by highlighting (as seen in FIG. 26).

Referring to FIGS. 25-26, screen shots of the example trading display of FIG. 2 is seen that shows the present invention having reduced the volume display to the normalized "99" from a basis request, and a substantial large volume of new input was allowed to accumulate. Note the sharpness in the lower volume area where the volume areas have been highlighted. The distribution lows usually have a sharply defined ending related to percentage of trade to the ending side versus the opposite upper side—10000 down to 1500 versus the rounded numbers of 6900-4200-6000 at the top of the range. In FIG. 26, the display was highlighted by a request to not show any normalized number less than 30 in a basis request. The subsequent display has revealed a zone of activity that is rather intermittent that resides between to full zones and a serial range of zeros at the low end, which indicate a strong influence of time over price. The intermittent zone indicates that a separation has occurred and has been maintained, which then defines vertical stability as resting above this level.

Figure 27:
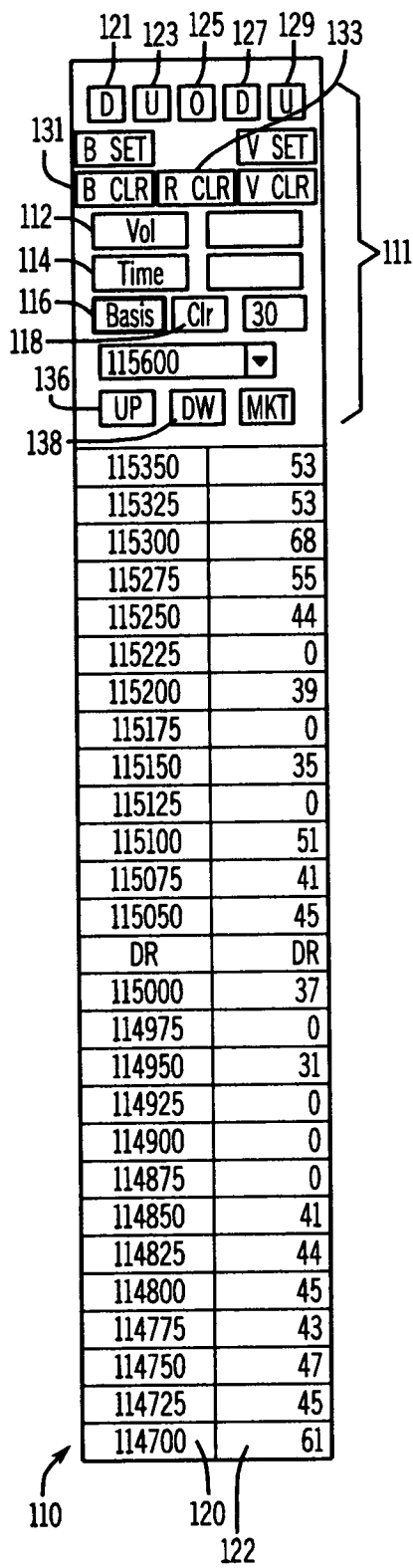

Referring now to FIG. 27, a screen shot of the example trading display of FIG. 2 is seen showing the elimination of all numbers less than 30, as was shown in FIG. 26. FIG. 27 was taken a little after FIG. 26 and shows a solid distribution volume above the intermittent zone of FIG. 26—thus showing the potential separation in the market occurred. The difference in the lower portion of the range of FIG. 26 is that the zeros are serial, and those above are intermittent. This would indicate solid time bottom, and that intermittent zone was one of a lesser degree of time/price and indicates that the market was more likely to advance than retrace this area and illustrates that the trade imbalance has moved in favor of those long the imbalance.

Figure 28:
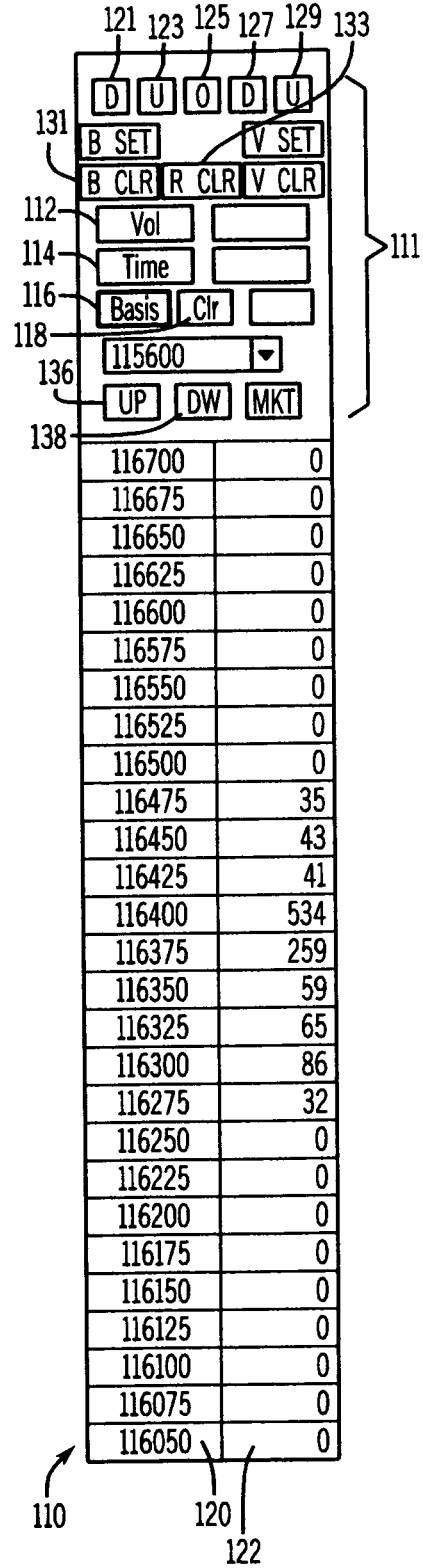
FIG. 28 is a screen shot of the example electronic trading display of FIG. 2 that shows a fourth re-set.

Referring now to FIG. 28, a screen shot of the example trading display of FIG. 2 is seen after subsequent restarts, showing how the present invention focuses on the current imbalance to the exclusion of the background. As the system is sequentially restarted, for example for a fourth re-set in FIG. 28, the present invention continually drops background and concentrates on current imbalance. The progression is to normalize the accumulated data allowing a slow integration of the new, then progressively after another restart move to defining that new data to the next new, and finally to just the latest new. The degree of progression is defined by the time allowed between restarts and/or resetting back at any time to the accumulated base and going again to the basis program for initial normalization with a more updated base.

Figure 29:
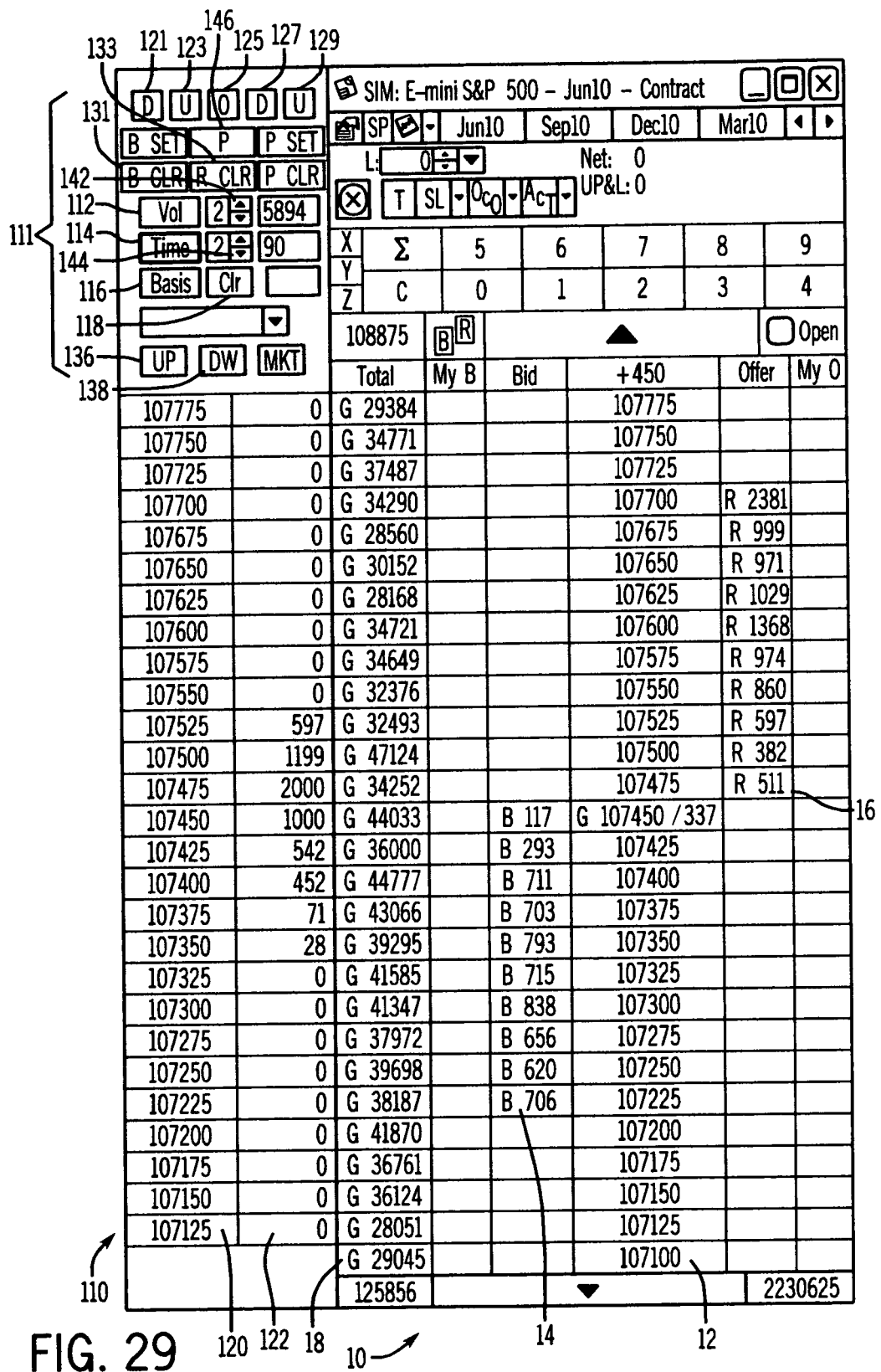
FIGS. 29-30 are screen shots of an example electronic trading interface on which an electronic trading interface in accordance with the principles of the present invention can be applied with an alternative embodiment of the control panel.
Figure 30:
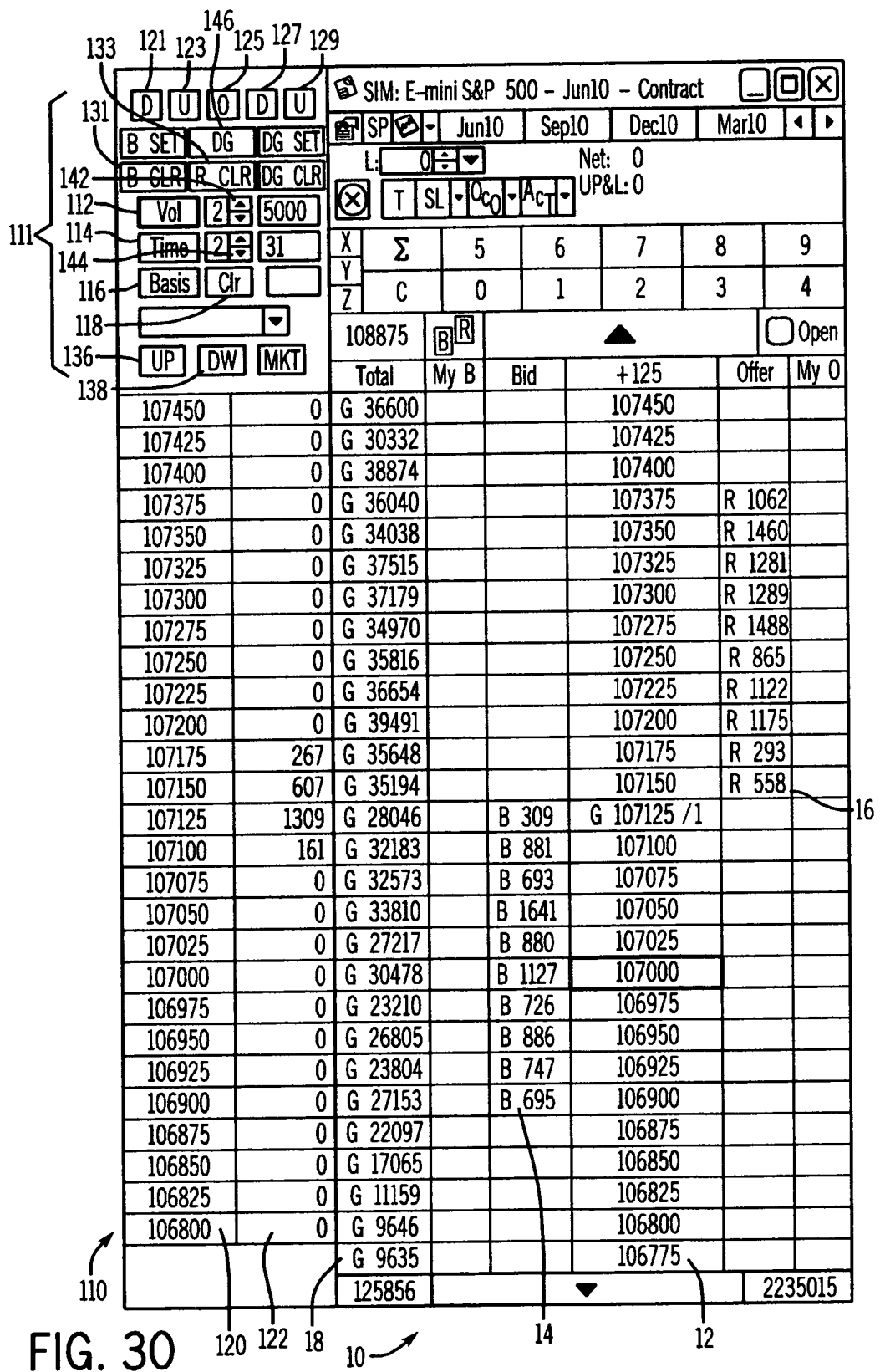

Referring now to FIGS. 29-30, trading displays in accordance with the principles of the present invention show an alternative embodiment of the control panel 111 of the present invention. The time functionality 114 now includes sequencing modules 142, 144. A user can select a given time, for example 90 seconds in FIG. 29, and select a number of times that given volume is sequenced, for example 2 in FIG. 29. The present invention then counts the number of contracts in that time period for each of the sequences. In this example, the volume read was 5894 and at the end of the sequence the program will hold that figure for eight seconds. This gives the user an insight into the speed and range of the market. The system also colors the volume range for the duration of the sequence selected, and then reverts back to normal.

Likewise, the volume functionality 112 includes sequencing module. A user can select a given volume, for example 5000 contracts in FIG. 30, and select a number of times that given volume is sequenced, for example 2 in FIG. 2. The present invention then counts the amount of time needed to for that given number of sequences, colors the range, and holds the time count for a given time such as eight seconds. In this example the program is 31 seconds into the 5000 contract request. Again, this gives the user an insight into the speed and range of the market.

In addition, the control panel 111 of FIGS. 29-30 can provide a number of different highlighting options. Thus, in FIG. 29 the user can highlight based on the displayed color. By clicking the highlight control button 146, the trader can sequence through a series of different color options and highlight with a given color. This same mechanism allows for deeper redaction where a user can utilize color coded for differing entry/exit program related to volume increases at any selected point in the volume array.

It should be understood that various changes and modifications preferred in to the embodiment described herein would be apparent to those skilled in the art. Such changes and modifications can be made without departing from the spirit and scope of the present invention and without demising its attendant advantages. It is therefore intended that such changes and modifications be covered by the appended claims.

What is claimed is:

1. An electronic trading system comprising:
a database configured to receive and store reported trade prices;
a processor in communication with the database, the processor configured to determine a largest volume for a trading price;
a processor in communication with the database, the processor configured to normalize the largest volume for a trading price to establish a highest volume number;
a processor in communication with the database, the processor configured to normalize remaining volumes for trading prices using the same method used to establish the highest volume number; and
a display in communication with the processor and the database, the display configured to display the normalized volumes for trading prices;
wherein a trader is able to read volume, thus providing an economic opportunity outside the singularity of the present.

2. The electronic trading system of claim 1 further wherein the processor establishes the highest volume number by dividing the largest volume for a trading price by an adjusted percentage of itself.

3. The electronic trading system of claim 2 further wherein the processor establishes the highest volume number by multiplying the largest volume for a trading price by 1% of itself plus 0.1, then defaulting to 99.

4. The electronic trading system of claim 2 further wherein the remaining volume numbers by multiplying volumes for trading prices by the adjusted percentage of the highest volume number.

5. The electronic trading system of claim 1 further wherein the highest volume number by dividing the largest volume for a trading price by an adjusted percentage of itself.

6. The electronic trading system of claim 1 further including a filter that displays price volumes above or below a pre-selected volume basis as a symbol.

7. The electronic trading system of claim 6 further wherein the filter displays volumes above or below a pre-selected volume basis as an "x".

8. The electronic trading system of claim 1 further including a filter that displays volumes below a pre-selected volume as non-existent.

9. The electronic trading system of claim 8 further wherein the filter displays volumes below a pre-selected volume basis as zero.

10. The electronic trading system of claim 1 further including the processor color-coding display output.

11. The electronic trading system of claim 10 further including the processor color-coding night session data.

12. The electronic trading system of claim 1 further wherein a portion of the display output is redacted.

13. The electronic trading system of claim 12 further wherein the depth of field related to redaction is increased to allow direct access to trade mechanisms as well as further define or highlight selected parts of the trading range.

14. The electronic trading system of claim 1 further wherein base volume distributions can be pulled out and displayed as either a limited time or volume amount that will be isolated upon the screen and run concurrently until requested to stop.

15. The electronic trading system of claim 1 further wherein volume/time and time/volume are segmented into units of activity for display.

16. An electronic method for displaying trading data comprising:
a database receiving reported trade prices;
a processor in communication with the database, the processor determining the largest volume for a trading price;
a processor in communication with the database, the processor normalizing the largest volume for a trading price to establish a highest volume number;
a processor in communication with the database, the processor normalizing remaining volumes for trading prices by the same method used to establish the highest volume number; and
a display in communication with the processor and the database, the display displaying the normalized volumes for trading prices;
wherein a trader is able to read volume, thus providing an economic opportunity outside the singularity of the present.

17. The electronic method for displaying trading data of claim 16 further including the processor establishing the highest volume number by dividing the largest volume for a trading price by an adjusted percentage of itself.

18. The electronic method for displaying trading data of claim 17 further including the processor establishing the highest volume number by multiplying the largest volume for a trading price by 1% of itself plus 0.1, then defaulting to 99.

19. The electronic method for displaying trading data of claim 17 further including the processor establishing the remaining volume numbers by multiplying volumes for trading prices by the adjusted percentage of the highest volume number.

20. The electronic method for displaying trading data of claim 16 further including the processor re-setting the highest volume number by dividing the largest volume for a trading price by an adjusted percentage of itself.

21. The electronic method for displaying trading data of claim 16 further including the processor applying a filter that displays price volumes above or below a pre-selected volume basis as a symbol.

22. The electronic method for displaying trading data of claim 21 further including the display displaying the filter volumes above or below a pre-selected volume basis as an "x".

23. The electronic method for displaying trading data of claim 16 further including the processor applying a filter that displays volumes below a pre-selected volume as non-existent.

24. The electronic method for displaying trading data of claim 23 further including the processor applying a filter that displays volumes below a pre-selected volume basis as zero.

25. The electronic method for displaying trading data of claim 16 further including the processor color coding display output.

26. The electronic method for displaying trading data of claim 25 further including the processor color coding night session data.

27. The electronic method for displaying trading data of claim 16 further including the processor redacting a portion of the display output.

28. The electronic method for displaying trading data of claim 27 further including the processor increasing the depth of field related to redaction to allow direct access to trade mechanisms as well as further define or highlight selected parts of the trading range.

29. The electronic method for displaying trading data of claim 16 further including the processor pulling out and displaying base volume distributions as either a limited time or volume amount that will be isolated upon the screen of the display and run concurrently until requested to stop.

30. The electronic method for displaying trading data of claim 16 further including the processor segmenting volume/time and time/volume into units of activity for display.

* * * * *